(12) United States Patent
Schnell et al.

(10) Patent No.: US 6,178,646 B1
(45) Date of Patent: *Jan. 30, 2001

(54) BLADE CLAMPING SYSTEM FOR A JIGSAW

(75) Inventors: John W. Schnell; Donald R. Bosten, both of Jackson; Daniel P. Wall, Humboldt; James T. Stolzer, Milan, all of TN (US)

(73) Assignee: Porter-Cable Corporation, Jackson, TN (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/113,394

(22) Filed: Jul. 10, 1998

(51) Int. Cl.[7] .................................................... B27B 19/09
(52) U.S. Cl. ............................................... 30/392; 279/44
(58) Field of Search ..................... 30/392–394; 279/71, 279/74, 44

(56) References Cited

U.S. PATENT DOCUMENTS

| 2,996,089 | 8/1961 | McCarty . |
| 3,303,861 | 2/1967 | Kane . |
| 3,339,598 | 9/1967 | Frostad . |
| 3,547,166 | 12/1970 | Dudek . |
| 4,090,297 | 5/1978 | Wanner et al. . |
| 4,512,078 | 4/1985 | Pfanzer . |
| 4,628,605 | 12/1986 | Clowers . |
| 4,665,617 | 5/1987 | Maier et al. . |
| 4,730,397 | 3/1988 | Weiford et al. . |
| 4,837,935 | 6/1989 | Maier et al. . |
| 5,012,583 | 5/1991 | Blochle et al. . |
| 5,165,173 | 11/1992 | Miller . |
| 5,205,043 | 4/1993 | Batt et al. . |
| 5,727,322 | 3/1998 | Giacometti . |

FOREIGN PATENT DOCUMENTS

| 25 46 527 | 4/1977 | (DE) . |
| 43 13 718 A1 | 11/1994 | (DE) . |
| 195 32 494 A1 | 3/1997 | (DE) . |
| 196 09 388 A1 | 9/1997 | (DE) . |
| 0 544 129 A1 | 6/1993 | (EP) . |
| 0 215 073 B2 | 3/1996 | (EP) . |
| 2 069 406 | 8/1981 | (GB) . |
| 2 296 888 | 7/1996 | (GB) . |
| 07266129 | 10/1995 | (JP) . |
| WO 96/28274 | 9/1996 | (WO) . |

Primary Examiner—Douglas D. Watts
(74) Attorney, Agent, or Firm—Merchant & Gould P.C.

(57) ABSTRACT

The present disclosure relates to a jig saw blade clamp including a first clamp member defining a main slot. A second clamp member is positioned within the main slot. The first clamp member is moveable relative to the first clamp member between a first position in which the first and second clamp members are adapted to clamp a blade, and a second position in which the blade can be inserted between the first and second clamp members. A collar is pivotally moveable in first and second opposite directions relative to the first and second clamp members. The collar includes a cam portion that moves the second clamp member toward the first position when the collar is pivoted in the first direction, and also moves the second clamp member toward the second position when the collar is pivoted in the second direction.

23 Claims, 16 Drawing Sheets

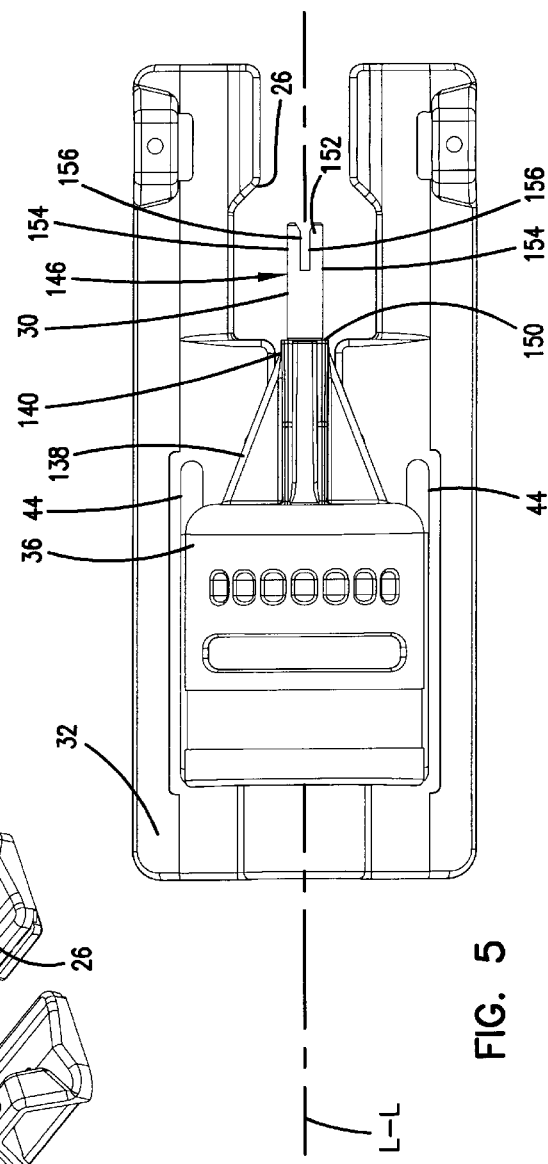
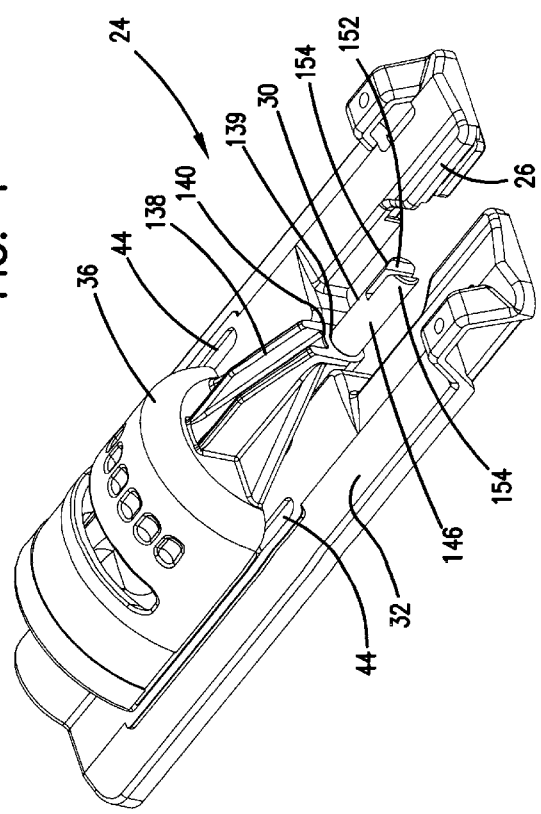
FIG. 4
FIG. 5

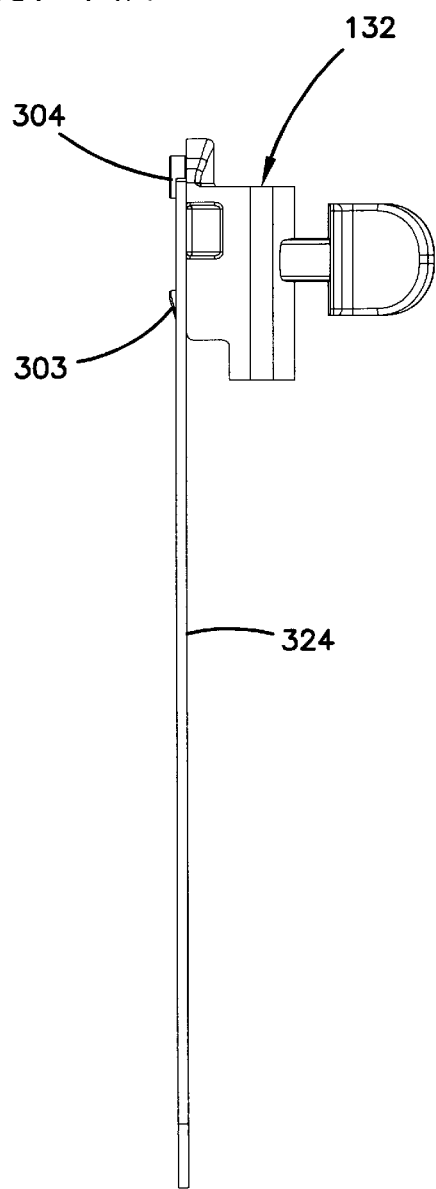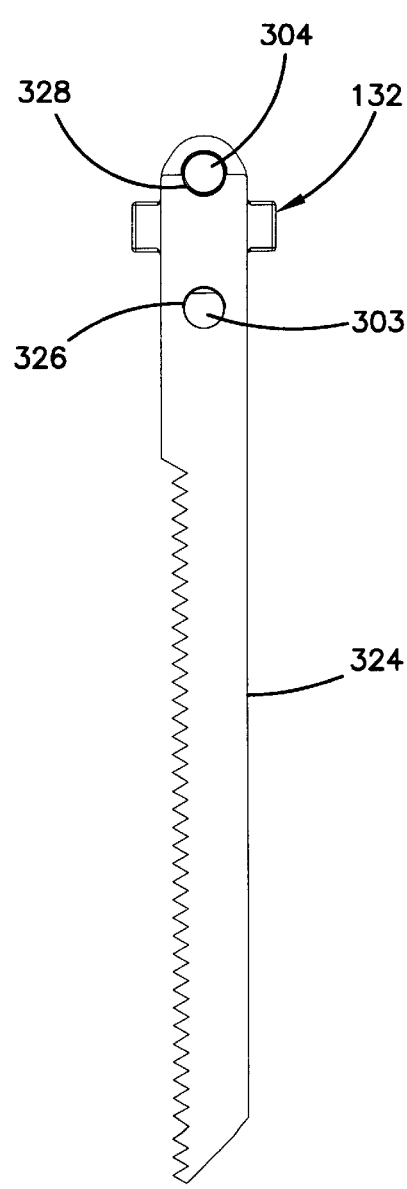

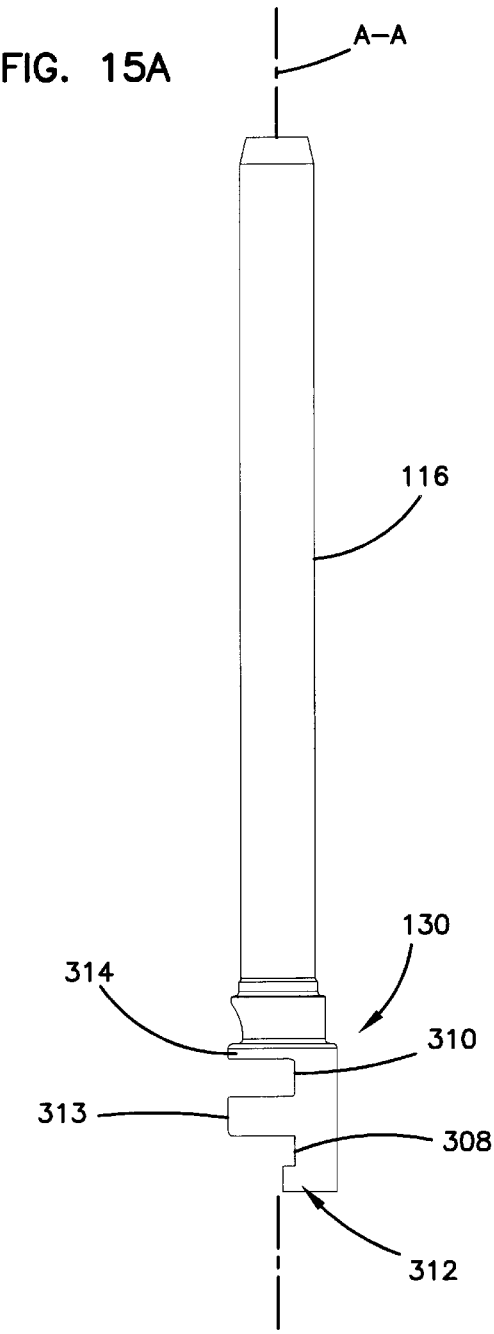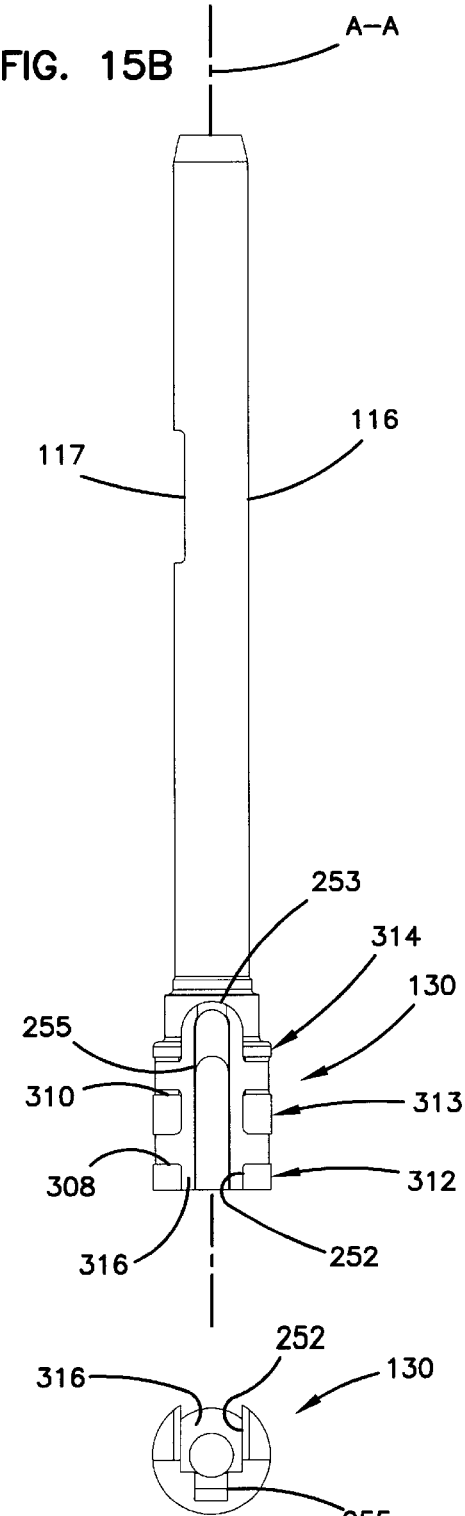
FIG. 15A
FIG. 15B
FIG. 15C

FIG. 16A
FIG. 16B
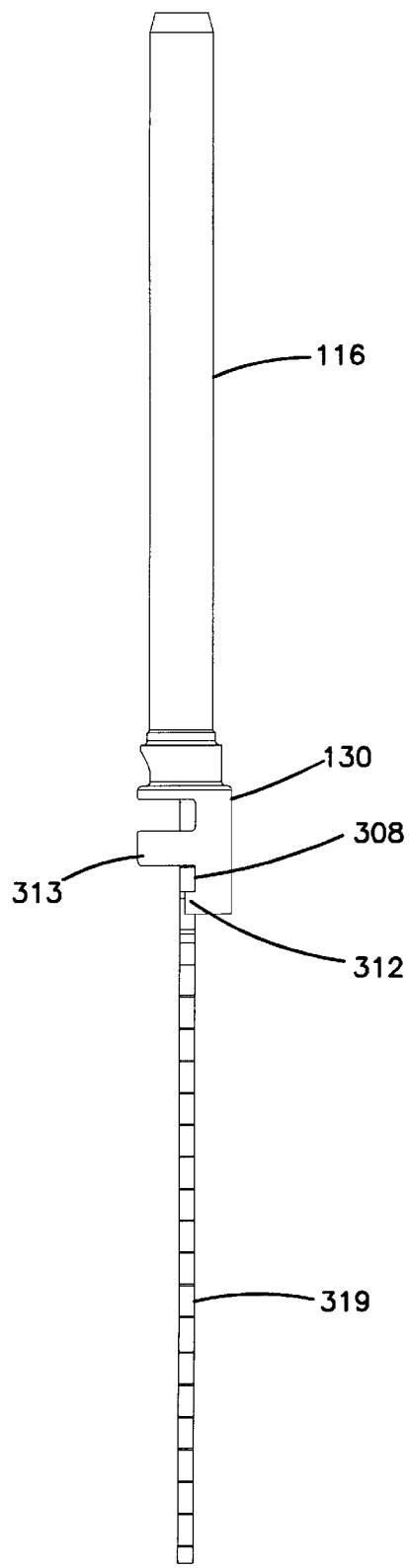
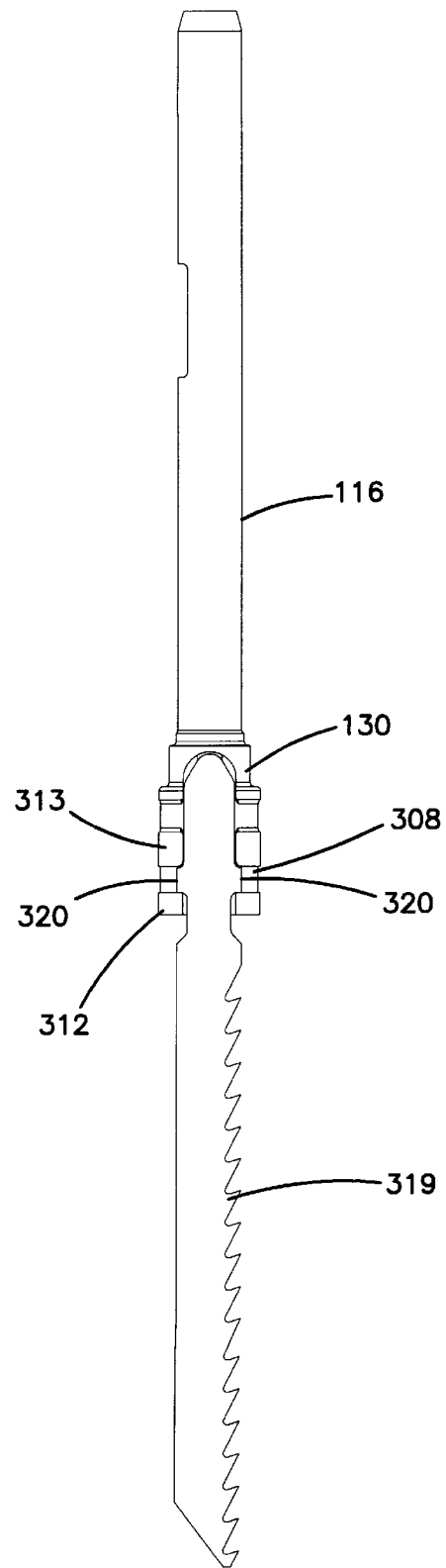

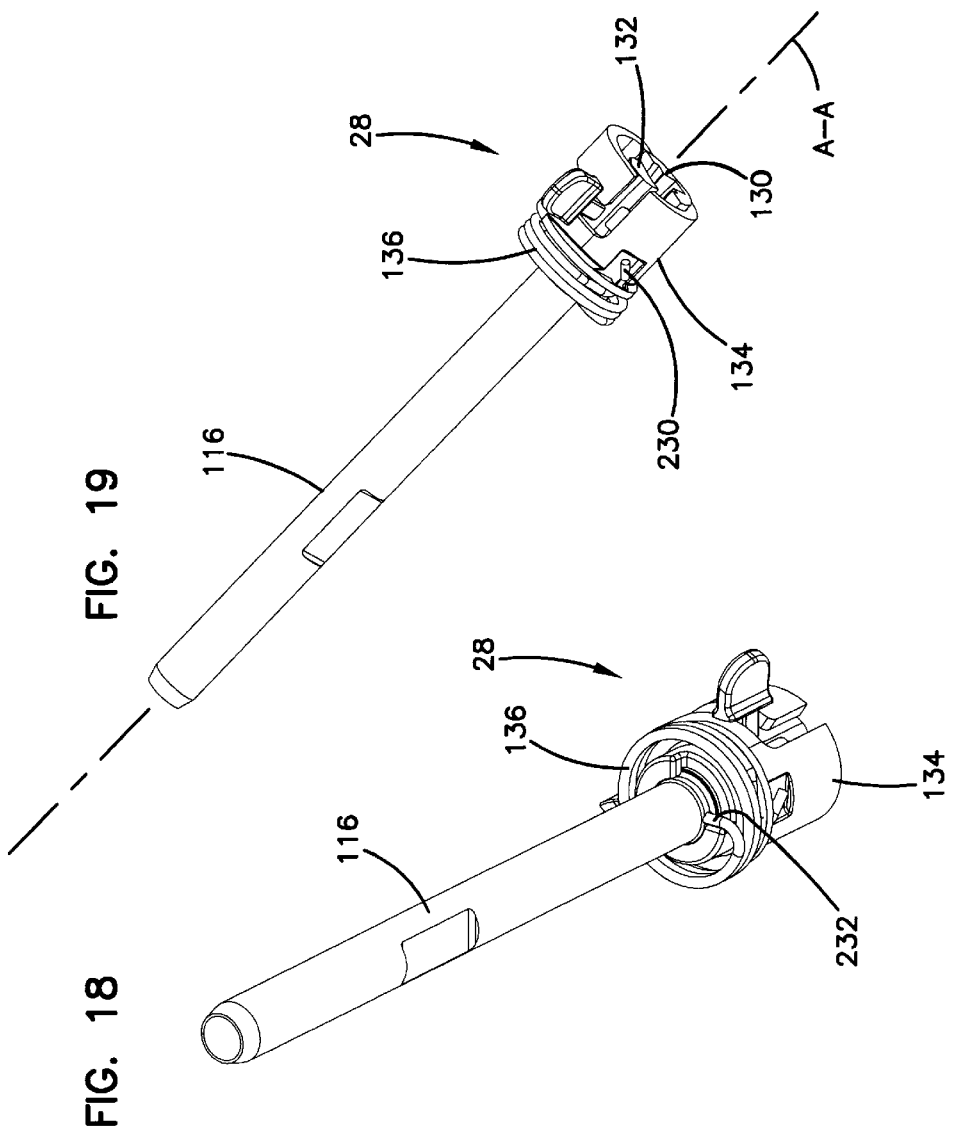
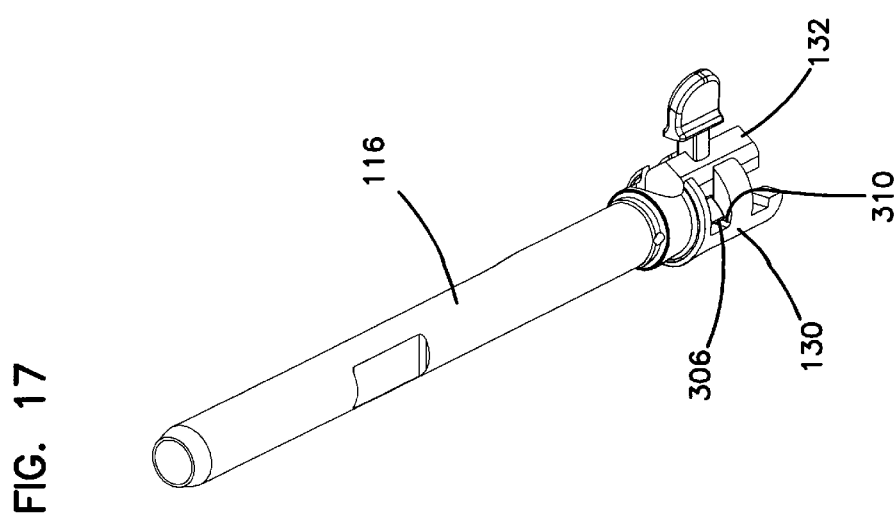
FIG. 17  FIG. 18  FIG. 19

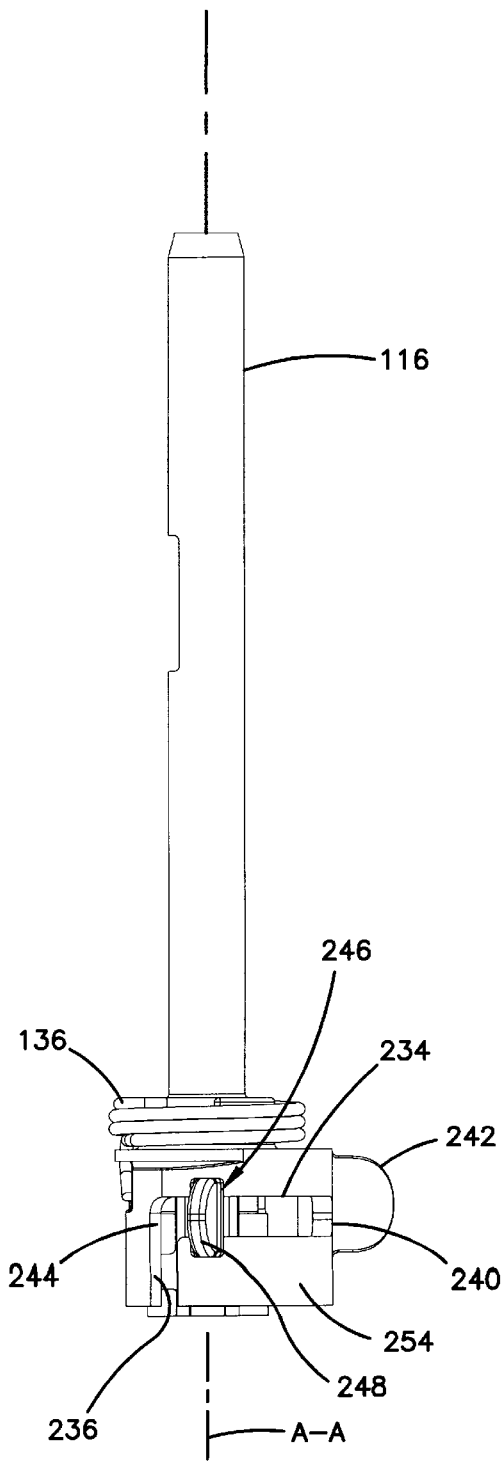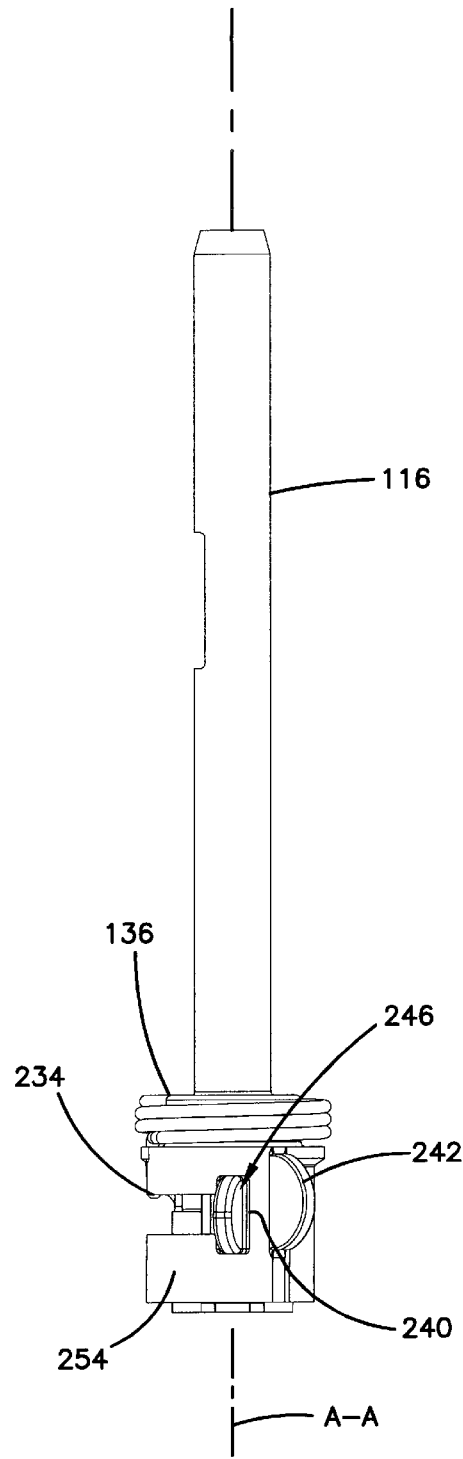

BLADE CLAMPING SYSTEM FOR A JIGSAW

FIELD OF THE INVENTION

The present invention relates generally to hand-held electric saws. More particularly, the present invention relates to blade clamping systems for reciprocal saws such as jigsaws.

BACKGROUND OF THE INVENTION

Electrically powered jigsaws, also known as saber saws, are well known in the art. A principle advantage of jigsaws over other types of hand-held saws such as circular saws or band-type saws is the ability to make curved cuts along relatively short radiuses. Consequently, jigsaws are particularly useful in performing tight scrolling cuts to cut curves into a work piece.

A conventional jigsaw typically includes an electric motor contained within a housing, and a shoe positioned beneath the housing. The shoe includes a bottom surface adapted to slide or ride along the top surface of a work piece. An open-ended slot is formed at a front end of the shoe. A straight, bayonet-type saw blade extends downward from the housing through the front slot. A leading edge of the blade includes a plurality of teeth that face in a forward direction toward the front of the shoe. In use, the blade is reciprocated in a generally up-and-down direction by the motor. As the blade is reciprocated, the jigsaw is manually advanced in a forward direction such that the teeth of the blade cut into a work piece. As the blade cuts into the work piece, the bottom surface of the shoe rides over the top of the work piece.

Some jigsaws are capable of producing an orbital blade motion. Such a motion has a rectilinear component of a generally up-and-down nature, and fore-and-aft motion advancing the cutting blade into the work piece. Typically, the blade advances on the cutting stroke, which is conventionally in the upstroke on most saws.

A variety of different blade types can be utilized with a jigsaw. For example, blades having different sizes, different teeth configurations, different teeth sizes, and different blade materials can be used. It is desirable to have a blade clamping system that allows blades to be quickly and easily interchanged.

SUMMARY OF THE INVENTION

An aspect of the present invention relates to a blade clamp that allows blades to readily be interchanged without requiring a tool.

Another aspect of the present invention relates to a single toolless blade clamp that can receive either universal or tang blades.

A further aspect of the present invention relates to a jig saw blade clamp including a first clamp member defining a main slot. A second clamp member is positioned within the main slot. The first clamp member is moveable relative to the first clamp member between a first position in which the first and second clamp members are adapted to clamp a blade, and a second position in which the blade can be inserted between the first and second clamp members. A collar is pivotally moveable in first and second opposite directions relative to the first and second clamp members. The collar includes a cam portion that moves the second clamp member toward the first position when the collar is pivoted in the first direction, and also moves the second clamp member toward the second position when the collar is pivoted in the second direction.

Still another aspect of the present invention relates to a jig saw blade clamp including first and second clamp members moveable between a blade release position in which a blade can be inserted between and removed from between the first and second clamp members, and a clamping position in which the first and second clamp members are adapted to clamp the blade thereinbetween. The first clamp member includes first and second spaced-apart shoulders separated by a gap. The first and second shoulders extend from the first clamp member toward the second clamp member, and are arranged and configured to trap a tang blade by engaging oppositely disposed tangs of a tang blade when the tang blade is positioned within the gap. The second clamp member includes a projection that extends from the second clamp toward the first clamp. The projection is arranged and configured to fit within a mounting opening of a universal blade when the universal blade is positioned in the gap between the shoulders.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated and constitute a part of the specification, illustrate several embodiments of the invention and together with the description, serve to explain the principles of the invention. A brief description of the drawings is as follows:

FIG. 4 is a perspective view of a shoe utilized by the jigsaw of FIG. 1;

FIG. 5 is a top view of the shoe of FIG. 4;

FIG. 13b is a left side view of the clamp member of FIG. 13a;

FIG. 13c is a top view of the clamp member of FIG. 13a;

FIG. 13d is a right side view of the clamp member of FIG. 13a;

FIG. 14a is a rear view of the movable clamp member of FIGS. 13a–13d, the movable clamp is shown connected to a universal blade;

FIG. 14b is a left side view of the movable clamp and universal blade of FIG. 14a;

FIG. 15a is a front view of a fixed clamp member that is used by the blade clamp shown in FIG. 2, the fixed clamp member is attached to a shaft;

FIG. 15b is a left side view of the clamp member and shaft of FIG. 15a;

FIG. 15c is a bottom view of the clamp member of FIG. 15a;

FIG. 16a is a front view of the fixed blade clamp of FIGS. 15a–15c with a tang blade inserted therein;

FIG. 16b is a left side view of the fixed clamp and blade of FIG. 16a;

FIG. 17 is a perspective view of the moveable clamp member of FIGS. 13a–13d inserted within the fixed clamp member of FIGS. 15a–15c;

FIG. 18 is a perspective view of an assembled blade clamp and blade clamp shaft utilized by the jigsaw of FIG. 1;

FIG. 19 is another perspective view of the assembled blade clamp and blade clamp shaft used by the jigsaw of FIG. 1;

FIG. 20a is an elevational view of the blade clamp and blade clamp shaft of FIG. 19 with the blade clamp in a clamped position;

FIG. 20b is an elevational view of the blade clamp and blade clamp shaft of FIG. 20a with the blade clamp in an unclamped position;

FIG. 21a is a schematic bottom view of FIG. 20a; and

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

Figure 1:
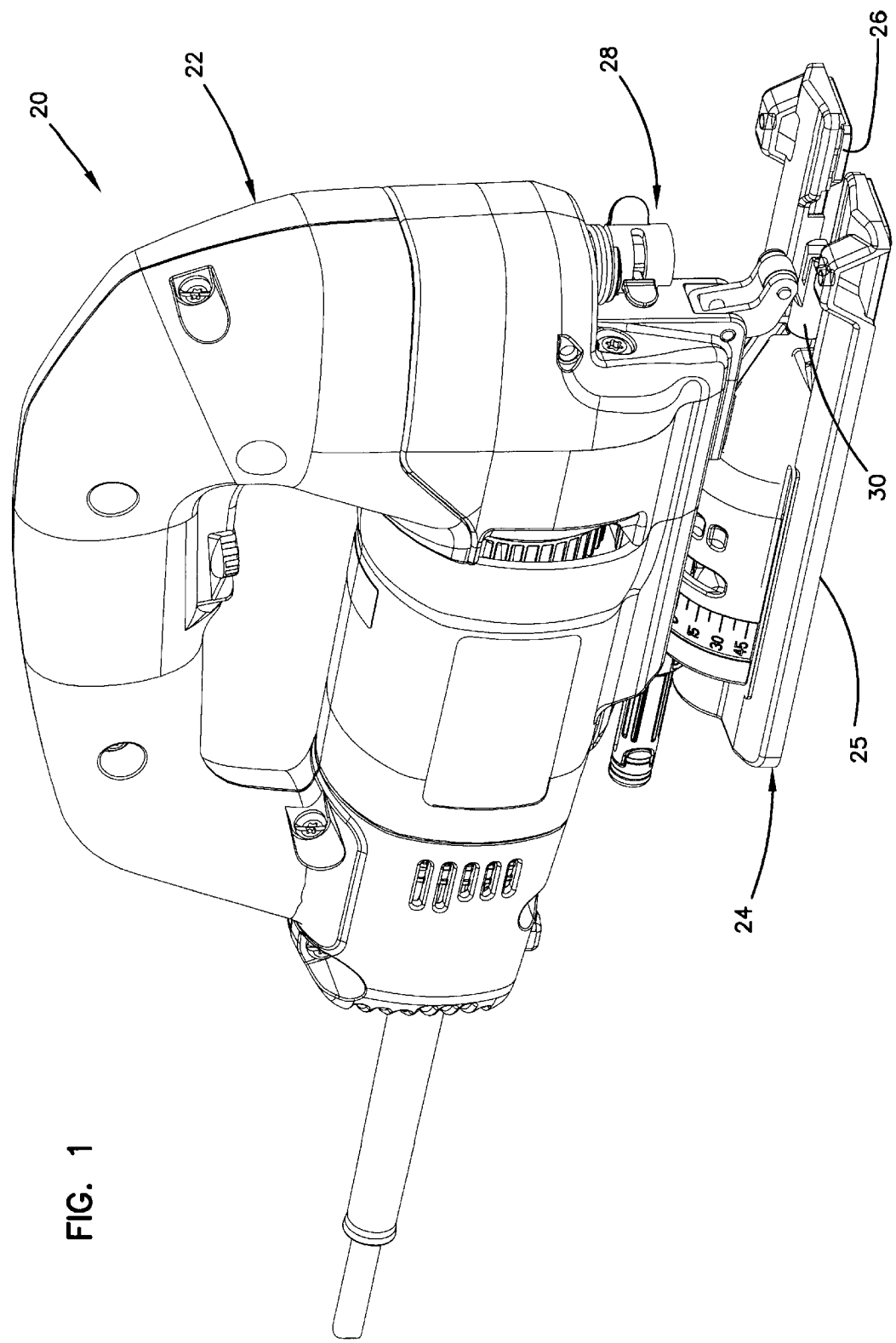
FIG. 1 is a perspective view of an embodiment of a jigsaw constructed in accordance with the principles of the present invention.

FIG. 1 is a perspective view of an embodiment of a jigsaw 20 constructed in accordance with the principles of the present invention. Generally, the jigsaw 20 includes a housing 22 pivotally connected to a base or shoe 24. A front end of the shoe 24 defines an open-ended main slot 26. A blade clamp 28 is positioned above the main slot 26. A blade guide 30 is positioned generally beneath the blade clamp 28. The blade guide 30 is pivotally connected to the shoe 24 and is adapted to receive and laterally support a jigsaw blade clamped within the blade clamp 28. The terms "base" and "shoe" are intended to be used interchangeably.

In general use, a blade is inserted in the blade clamp 28 such that the blade extends downward through the blade guide 30 and also through the main slot 26. The teeth of the blade preferably face a forward direction toward the open end of the slot 26, and at least a portion of the blade preferably extends below a bottom surface of the shoe 24. When the jigsaw 20 is activated, the blade clamp 28 and its corresponding blade are oscillated in a generally up-and-down motion. By placing the bottom surface of the shoe 24 against a work piece, and moving the jigsaw 20 in a forward direction, the teeth of the reciprocating blade are brought into contact with the work piece thereby creating a cut in the work piece.

Figure 2:
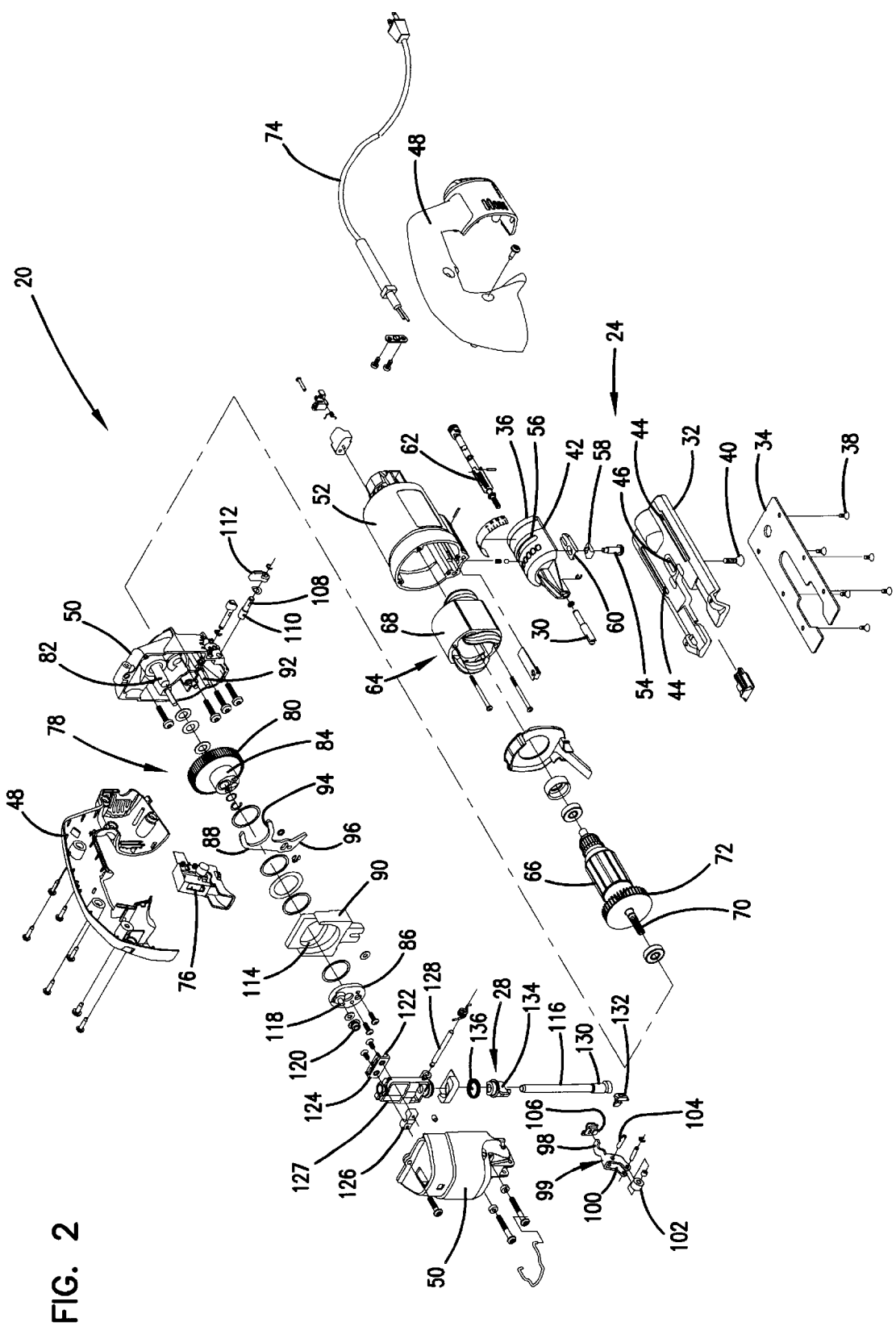
FIG. 2 is an exploded view of the jigsaw of FIG. 1.
Figure 3:
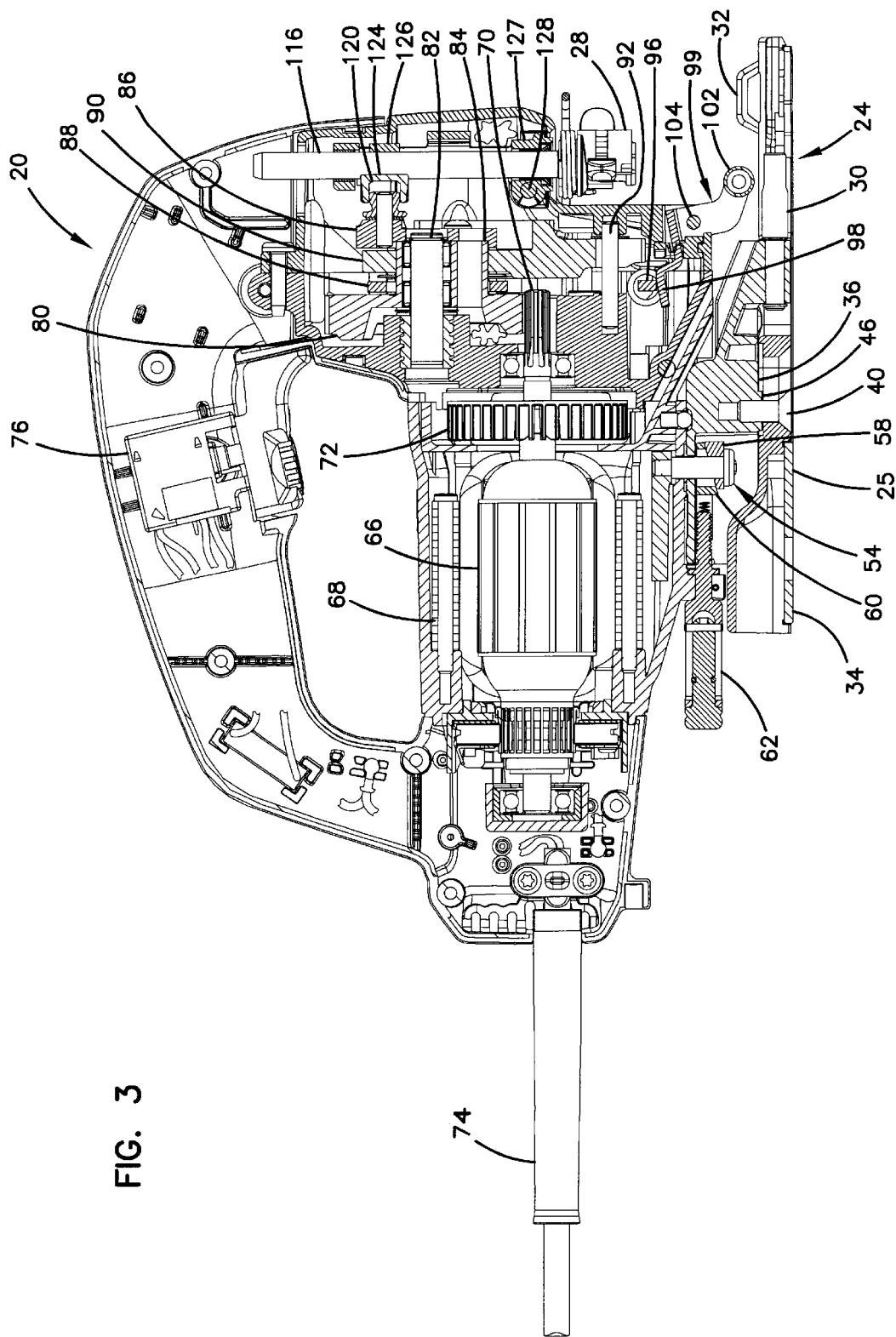
FIG. 3 is a cross-sectional view longitudinally bisecting the jigsaw of FIG. 1.

FIGS. 2 and 3 provide a more detailed illustration of each of the components of the jigsaw 20. Referring to FIG. 2, the shoe 24 of the jigsaw 20 includes a main base 32, a sub base 34 positioned below the main base 32, and a pivot base 36 positioned above the main base 32. The sub base 34 is connected to the main base 32 by a plurality of bolts 38, while the pivot base 36 is connected to the main base 32 by bolt 40. Outer edges 42 of the pivot base 36 fit within longitudinal slots 44 formed on the top of the main base 32. The bolt 40 extends through a longitudinally elongated opening 46 defined by the main base 32. By loosening the bolt 40, the pivot base 36 can be slid longitudinally along the slots 44 relative to the main base 32. When the pivot base 36 is oriented in a desired longitudinal position, the bolt 40 can be tightened to clamp or retain the pivot base 36 in the desired longitudinal position relative to the main base 32.

The housing 22 of the jigsaw 20 includes several different components. For example, as shown in FIG. 2, the housing 22 includes a handle set 48 and a gear housing set 50. Each of the sets 48 and 50 includes two separate pieces that are bolted together. The housing 22 also includes a motor housing 52 positioned behind the gear housing set 50.

The motor housing 52 is pivotally mounted on top of the pivot base 36. The motor housing 52 is connected to the pivot base 36 by a shoulder bolt 54 that extends upward through a curved slot 56 that extends across a width of the pivot base 36. A clamping structure is used to tighten or loosen the pivotal connection between the pivot base 36 and the motor housing 52. The clamping structure includes a fixed ramp or wedge 58, a moveable ramp or wedge 60, and a threaded adjustment shaft 62. By rotating the threaded adjusted shaft 62 in a first direction, the clamp structure is tightened such that pivotal motion between the pivot base and the motor housing 52 is inhibited. By contrast, when the threaded adjustment shaft 62 is rotated in a second direction opposite to the first direction, the clamping structure is loosened thereby allowing the motor housing 52 to be manually pivoted relative to the pivot base 36.

An electric motor 64 is contained within the motor housing 52. The motor 64 includes an armature portion 66 that is rotatably mounted within a field portion 68. The armature portion 66 includes a pinion gear 70 and a fan 72. The motor 64 receives electrical power through an electrical cord 74. A switch 76 controls the flow of electricity between the electrical cord 74 and the motor 64.

The electric motor 64 functions to rotate the pinion gear 70 about a generally longitudinal axis. The rotation of the pinion gear 70 is converted into a reciprocal up and down motion by a drive mechanism 78. While a specific drive mechanism is shown and described, it will be appreciated that a variety of suitable drive arrangements or mechanisms are known in the art, and that any type of arrangement that generates reciprocal up and down motion can be used in accordance with the principles of the present invention. In using the term up and down motion, it is intended that such a term includes rectilinear up and down motion as well as orbital up and down motion.

The drive mechanism 78 includes a main drive gear 80 that is rotatably mounted on a pin 82 secured to the gear housing 50. The main drive gear 80 is rotated about the pin 82 by the pinion gear 70 of the motor 64. A cam 84, that is eccentric with respect to the pin 82, is formed on the main drive gear 80. A crank block 86 is bolted to the eccentric cam 84. An orbit lever 88 and a counterweight 90 are positioned between the main drive gear 80 and the crank block 86.

The orbit lever 88 is pivotally mounted on a pin 92 secured to the gear housing 50. The orbit lever 88 includes a u-shaped slot 94 that receives the eccentric cam 84 of the main drive gear 80. As the main drive gear 80 is rotated, the eccentric cam 84 pivots the orbit lever 88 back and forth about the pin 92. As the orbit lever 88 is pivoted back and forth, a lower arm 96 of the orbit lever 88 engages a lever arm 98 causing the lever arm 98 to be reciprocated up and down. The lever arm 98 is part of a roller holder 99 that includes a fork 100 in which a roller 102 is rotatably mounted. The roller holder 99 is pivotally mounted on a pivot pin 104. When the lever arm 98 is moved up and down by the orbit lever 88, the roller holder 99 is pivoted back and forth about the pivot pin 104. A rubber grommet 106 biases the lever arm 98 in an upward direction.

The roller holder 99 allows the jigsaw 90 to move a blade in an orbital up and down motion. For example, when a jigsaw blade is inserted within the blade clamp 28, a rear portion of the blade engages the roller 102 held by the roller holder 99. When the roller holder 99 is pivoted back and forth by the orbit lever 88, the roller 102 causes the blade to move forward and backward. Concurrently, the blade is reciprocated in an up and down motion by the blade clamp 28. In this manner, the blade is moved in an orbital up and down motion.

The amount of orbital motion provided to the blade is dependent upon the amount the roller holder 99 is pivoted about the pivot pin 104. In this regard, the jigsaw 20 is provided with an orbital motion adjustment mechanism for controlling the forward and backward movement of the blade. The adjustment mechanism includes an orbital motion adjustment shaft 108 including a cam surface 110 that engages the lever arm 98 of the roller holder 99. A knob 112 is used to rotate the shaft 108. By rotating the shaft 108, a spacing between the lever arm 98 and the lower arm 96 of the orbit lever 88 can be adjusted. For example, when the shaft 108 is in a first position, the cam surface 110 allows the lever arm 98 to be in close proximity to the lower arm 96 of the orbit lever 88. Consequently, a maximum amount of orbital motion is generated. By contrast, when the shaft 108 is in a second position, the cam surface 110 pushes the lever arm 98 a sufficient distance away from the lower arm 96 of the orbit lever 88 such that the orbit lever 88 fails to contact the lever arm 98 when the main gear 80 is rotated. As a result, no orbital motion is generated. It will be appreciated that the shaft 108 can be oriented at intermediate positions between the first and second positions in order to achieve intermediate amounts of orbital motion.

The counterweight 90 of the drive mechanism 78 includes an opening 114 that is elongated in a lateral direction. The eccentric cam 84 is received within the opening 114 such that the counterweight is reciprocated up and down as the main drive gear 80 is rotated. It will be appreciated that the reciprocation of the counterweight 90 is 180 degrees out of phase with respect to the reciprocation of a blade secured to the jigsaw 20.

The crank block 86 of the drive mechanism 78 is used to convert the rotational motion of the drive gear 80 into rectilinear motion. For example, the crank block 86 is used to reciprocate a blade holder shaft 116 in an up and down motion. The blade clamp 28 is connected to a lower end of the blade holder shaft 116. The blade clamp 28 includes a fixed clamp member 130 that is fixedly connected to the bottom of the blade holder shaft 116, a moveable clamp member 132 that is moveable with respect to the fixed clamp member 130, a collar 134 that is mounted over both the fixed and moveable clamp members 130 and 132, and a coil spring 136.

The crank block 86 includes a pin 118 on which a roller 120 is mounted. The roller 120 fits within a lateral slot 122 formed in a drive bracket 124. The blade holder shaft 116 is fixedly clamped between the drive bracket 124 and a drive clamp 126. The blade holder shaft 116 is also slidably mounted in a bearing holder assembly 126 that is pivotally mounted on a shaft 128 secured to the gear housing 50.

As the crank block 86 is rotated by the main drive gear 80, the roller 120 is laterally reciprocated within the lateral slot 122 and causes the drive bracket 124 to be oscillated up and down. Because the blade holder shaft 116 is fixedly clamped between the drive bracket 124 and the drive clamp 125, the reciprocation of the drive bracket 124 also causes a blade holder shaft 116 to be reciprocated in an up and down motion. As the blade holder shaft 116 is reciprocated in an up and down motion relative to the bearing holder assembly 126, the shaft 128 allows the bearing holder assembly 126 to pivot to accommodate orbital motion of a blade secured to the blade secured within the blade clamp 28.

Figure 6:
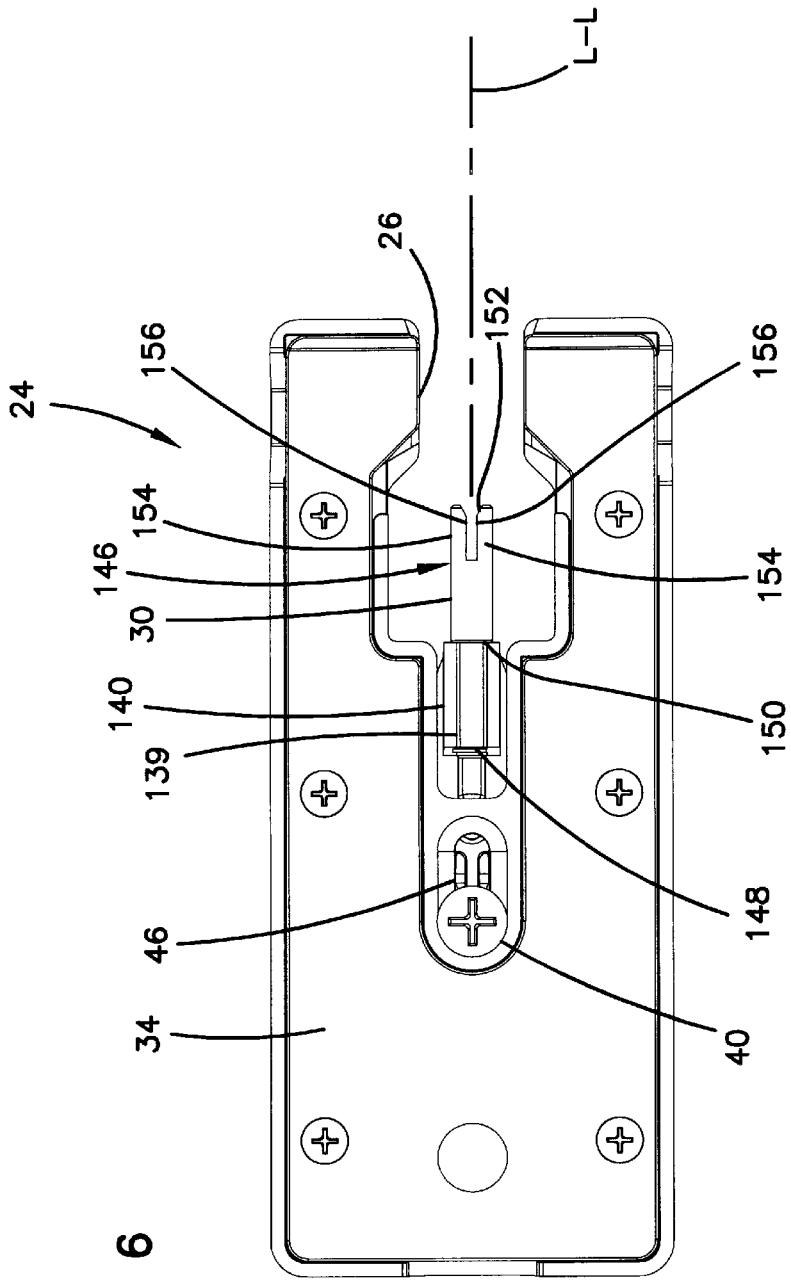
FIG. 6 is a bottom view of the shoe of FIG. 4.

FIGS. 4–6 provide various views of the shoe 24 in isolation from the remainder of the jigsaw 20. Referring to FIGS. 4–6, the blade guide 30 is connected to the pivot base 36 of the shoe 24 and is positioned within the main slot 26 defined by the shoe 24. As positioned in the slot 26, the blade guide 30 is preferably relatively close to the sub base 34. Consequently, when the jigsaw 20 is used to cut a workpiece, the blade guide 30 is positioned relatively close to the workpiece thereby enhancing the amount of lateral support provided to the blade.

The blade guide 30 is pivotally connected to a front portion 138 of the pivot base 36. The front portion 138 includes a sleeve 140 defining a cylindrical bore 139 aligned along a longitudinal axis L—L of the shoe 24. The blade guide 30 is pivotally mounted within the bore 139 of the sleeve 140. The blade guide 30 is retained in the sleeve 140 by a snap ring 148 that engages the rear side of the sleeve 140, and a radial shoulder 150 that engages a front side of the sleeve 140.

A front portion 146 of the blade guide 30 projects forwardly from the pivot base 36 into the main slot 26 of the shoe 24. The front portion 146 defines a front blade slot 152 sized for receiving a jigsaw blade. The front blade slot 152 has an open end that faces the front of the shoe 24. The blade guide 30 is aligned along and pivotally moveable about the longitudinal axis L—L.

The blade slot 152 of the blade guide 30 is formed by two spaced-apart projections 154. For example, the blade slot 152 is defined by opposing, generally planar inner surfaces 156 of the projections 154. The blade slot 152 is wide enough to allow a blade to freely reciprocate within the blade slot 152. While the blade is reciprocated, the inner surfaces 156 provide lateral support that resists twisting of the blade. In certain embodiments of the present invention, a threaded pin (not shown), or other type of pin, can extend transversely through the projections 154 into the slot 152. Such a pin is adapted to engage the blade within the blade slot 152. In this manner, the pin functions to effectively narrow the width of the slot 152.

As previously described, the position of the pivot base 36 can be longitudinally adjusted relative to the main base 32. For example, by loosening bolt 40, the pivot base 36 can be slid longitudinally along slots 44 and along the elongated opening 46 formed through the main base 32. By adjusting the longitudinal position of the pivot base 36 relative to the main base 32, the longitudinal position of the blade guide 30 within the main slot 26 can also be adjusted.

Figure 7A:
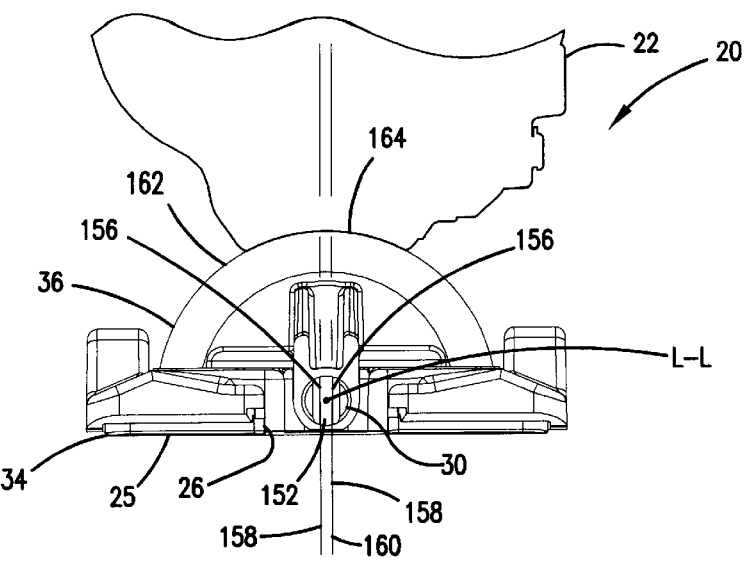
FIG. 7a is a front view of the jigsaw of FIG. 1 with the blade oriented in a perpendicular cutting position relative to the base.

Referring now to FIG. 7a, a schematic front view of the jigsaw 20 is illustrated. As shown in FIG. 7a, the blade guide 30 is positioned in the main slot 26 and is in close proximity to a bottom surface 141 of the sub base 34. The inner surfaces 156 defining the blade slot 152 are shown facing and in close proximity to opposite lateral surfaces 158 of a blade 160.

Still referring to FIG. 7a, the pivot base 36 includes a convex surface 162 that is centered on or swung about the longitudinal axis L—L. Additionally, the housing 22 includes a concave surface 164 that is centered on or swung about the longitudinal axis L—L. The concave surface 164 is adapted to slide relative to the convex surface 162 when the housing 22 is pivoted relative to the pivot base 36.

Figure 7B:
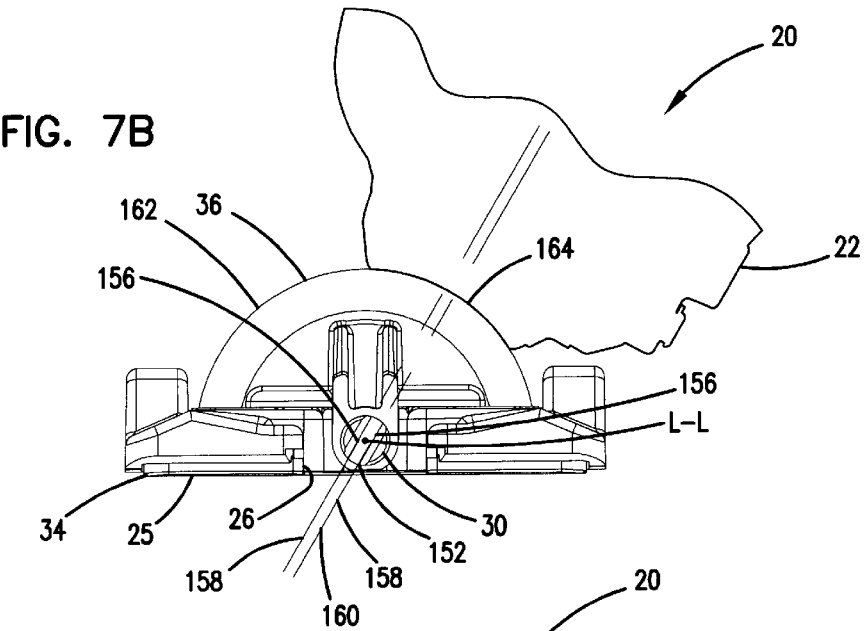
FIG. 7b is a front view of the jigsaw of FIG. 1 with the blade pivoted counter-clockwise to a 45° angle cutting position relative to the base.
Figure 7C:
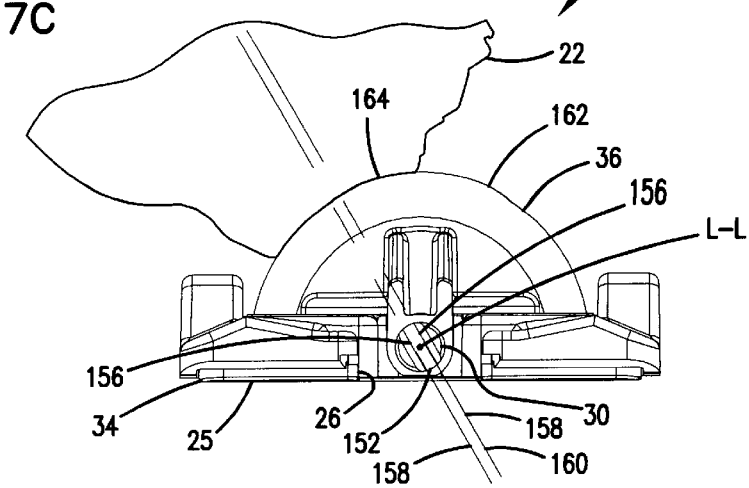
FIG. 7c is a front view of the jigsaw of FIG. 1 with the blade pivoted clockwise to a 45° cutting angle relative to the base.

The blade guide 30, the blade 160, and the housing 22 are all pivotally moveable about the same longitudinal axis L—L. To adjust a cutting angle of the blade 160 relative to the shoe 24, the housing 22 and blade 160 are pivoted as a unit about the longitudinal axis L—L. As the housing 22 and blade 160 are pivoted, contact between the blade 160 and the blade guide 30 causes the blade guide 30 to concurrently pivot about the longitudinal axis L—L. FIG. 7a shows the blade 160 aligned at a perpendicular cutting position relative to the bottom surface 141 of the shoe 24. FIG. 7b shows the blade 160 pivoted clockwise to a 45 degree cutting angle relative to the bottom surface 141 of the shoe 24. FIG. 7c shows the cutting blade 160 pivoted counterclockwise to a 45 degree cutting angle relative to the bottom surface 141 of the shoe 24.

Figure 8:
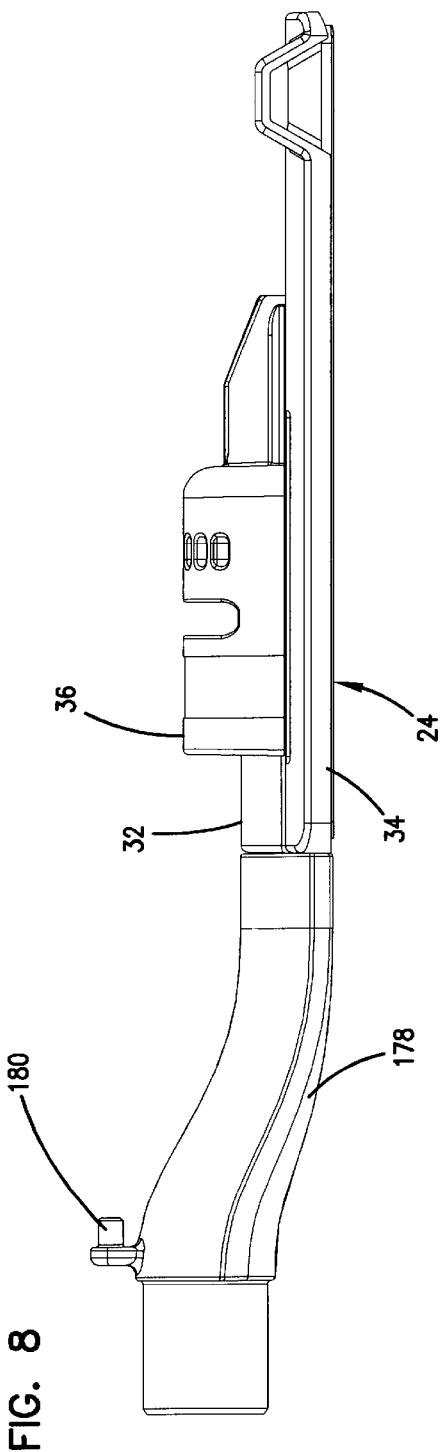
FIG. 8 is a side view of the shoe of FIG. 4 with a dust wand connected to the shoe.
Figure 9:
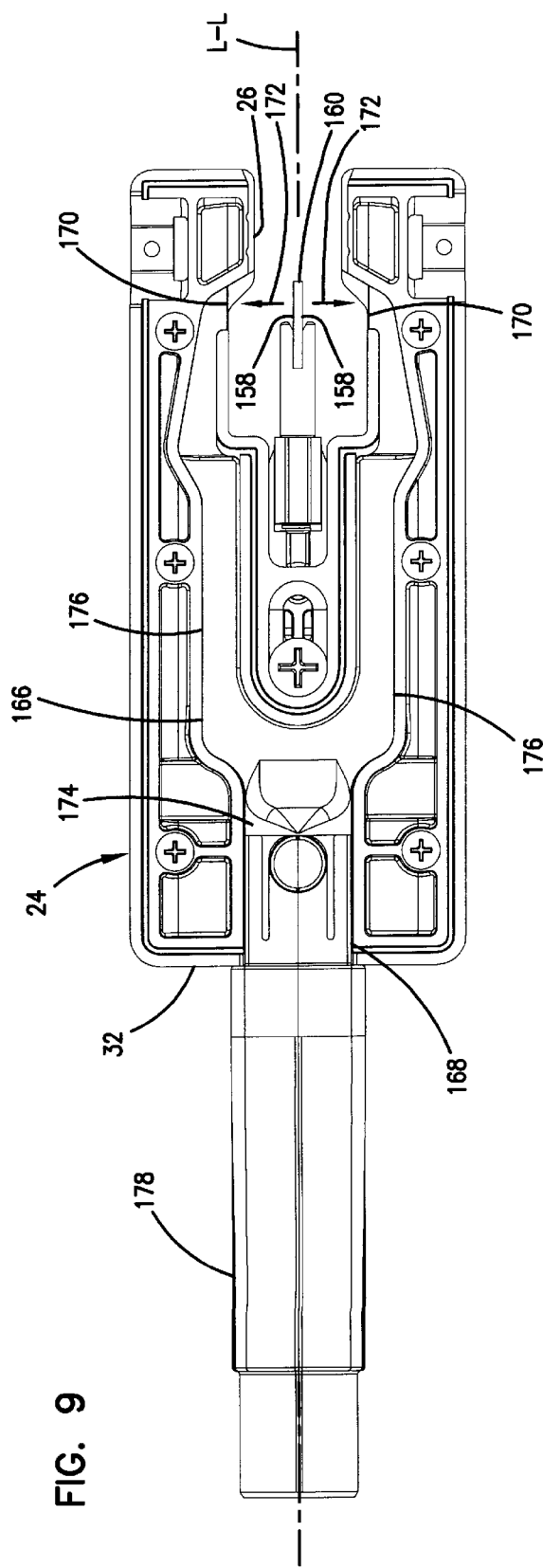
FIG. 9 is a bottom view of the shoe of FIG. 8 with the sub-base removed.

FIGS. 8 and 9 illustrate an exemplary dust collection system used by the jigsaw 20. Referring to FIG. 9, the dust collection system includes a dust chamber 166 integrally formed beneath the main base 32. Although FIG. 9 shows the dust chamber 166 with the sub base 34 removed, it will be appreciated that when the sub base 34 is secured to the main base 32, the sub base 34 effectively seals the dust chamber 166.

Referring again to FIG. 9, the dust chamber 166 includes an outlet port 168 formed at the rear of the main base 32, and two inlet ports 170 positioned on opposite sides of the main slot 26 defined by the shoe 24. The inlet ports 170 are positioned on opposite sides of the blade 160 and are arranged and configured to suction sawdust generally transversely away from the lateral surfaces 150 of the blade 160. In other words, the inlet ports 170 draw dust laterally away from the lateral surfaces 158 as shown by arrows 172. For certain embodiments of the present invention, the inlet ports 170 draw or suction dust in a direction generally transverse with respect to the longitudinal axis L—L of the sub base 24.

The dust chamber 166 provides fluid communication between the outlet port 168 and the inlet ports 170. Specifically, the dust chamber 166 includes a main portion 174 and two channel portions 176 that are in fluid communication with the main portion 174. The two channel portions 176 branch outward from the main portion 174 and include portions that are laterally spaced apart and generally parallel. The channel portions 176 extend along opposite sides of the main slot 26 and each channel portion 176 is in fluid communication with a respective one of the inlet ports 170. In use of the dust collection system, an external source of vacuum is placed in fluid communication with the outlet port 168. The source of vacuum creates a vacuum within the dust chamber 166 that causes air and dust to be drawn into the dust chamber 166 through the inlet ports 170. From the inlet ports 170, the evacuated air and dust travel through the channel portions 176 to the main portion 174, and exit the dust chamber 166 through the outlet port 168.

To facilitate connecting a source of vacuum to the outlet port 168, an adapter or dust wand 178 can be used. The dust wand 178 has one end that snaps or friction fits within the outlet port 168, and a second end adapted for connection to an external source of vacuum. For example, a vacuum hose can be friction fit over the second end of the dust wand 178. The dust wand 178 also includes a tab 180 that fits within an aperture defined by the rear of the housing 22 to provide vertical support to the dust wand 178.

Figure 10:
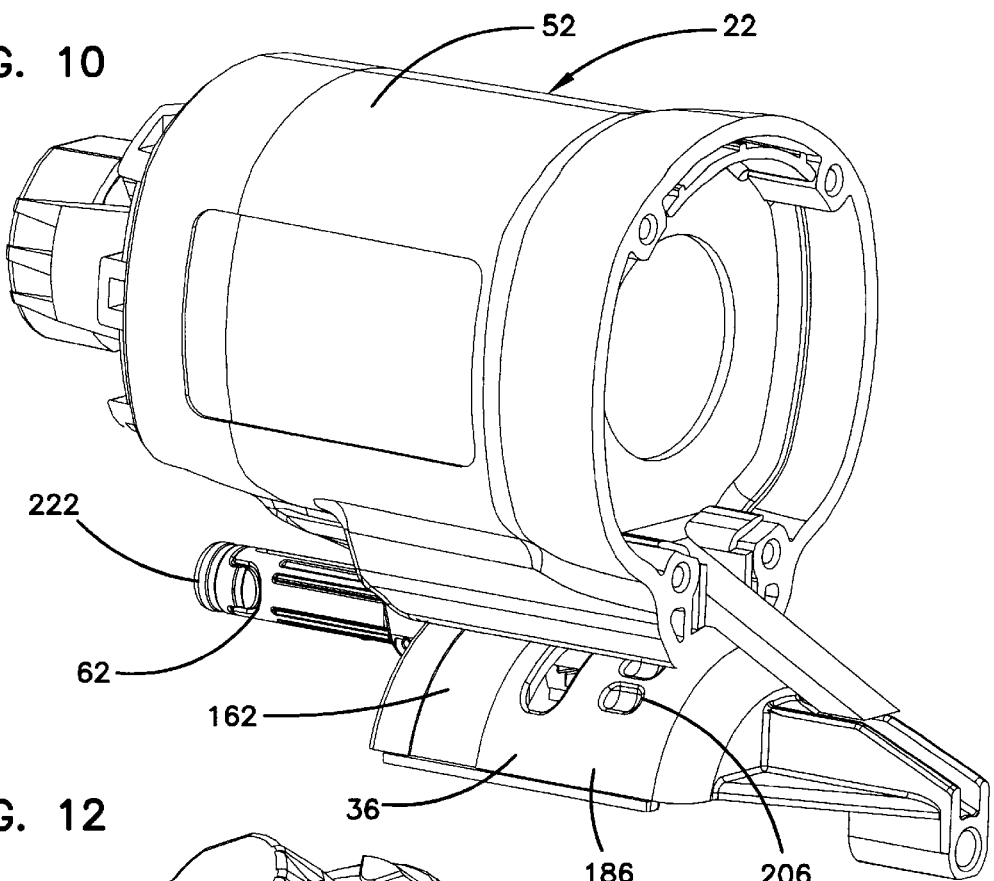
FIG. 10 is a perspective view of a motor housing and pivot base utilized by the jigsaw of FIG. 1.
Figure 12:
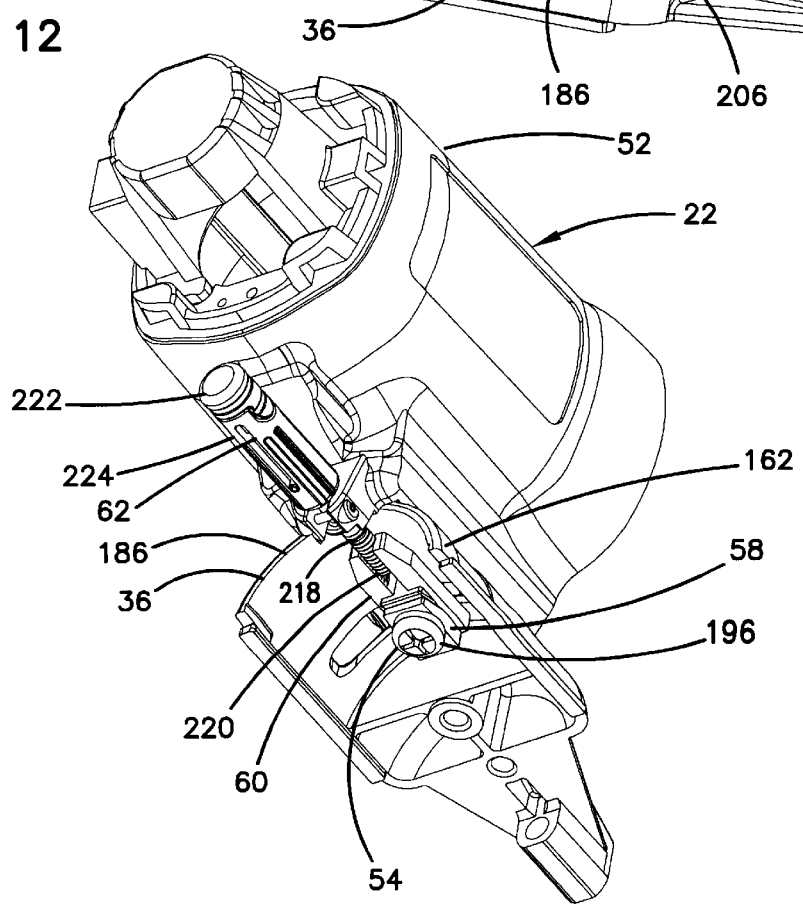
FIG. 12 is a bottom perspective view of the motor housing and pivot base of FIG. 10.
Figure 11:
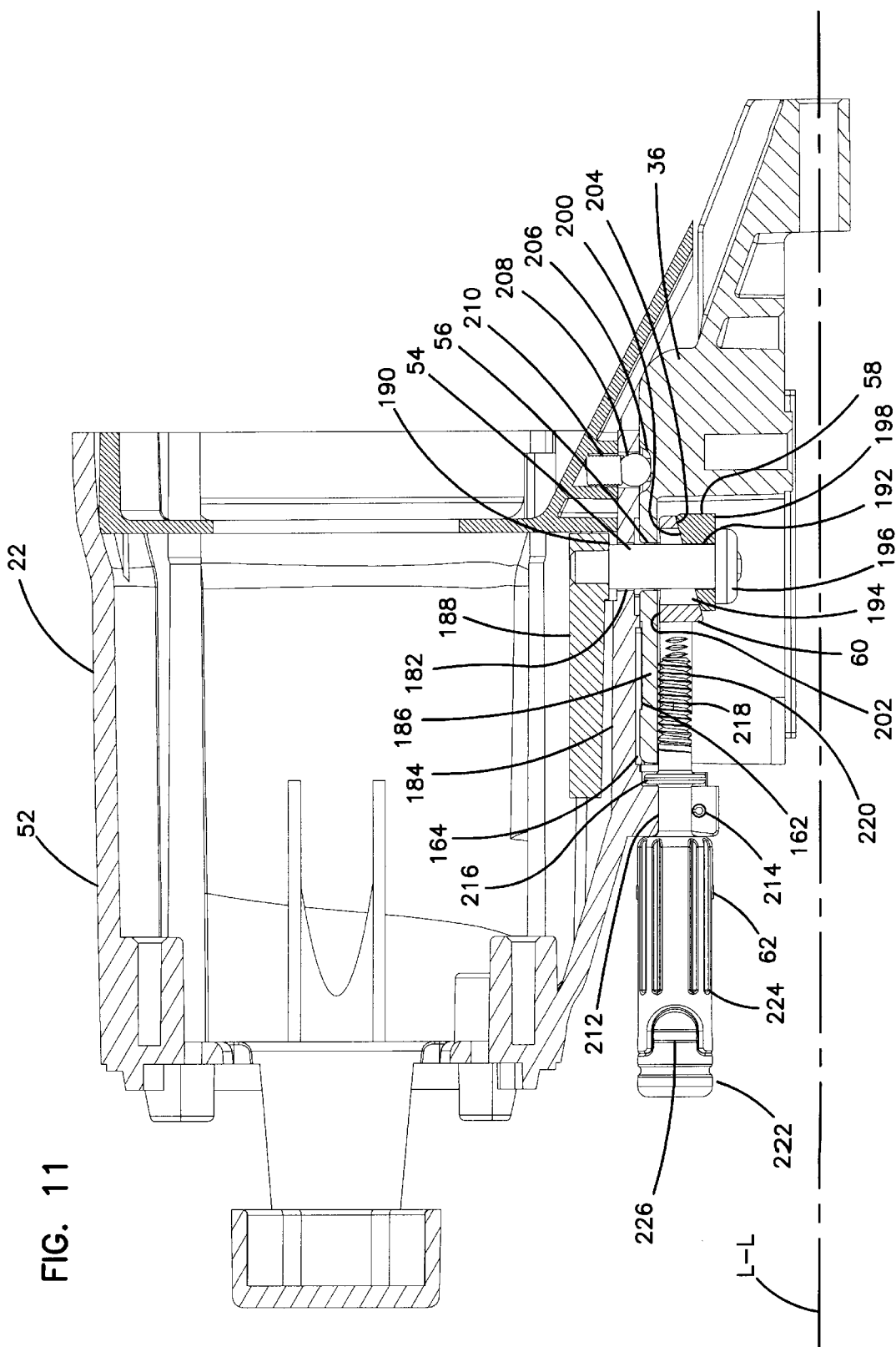
FIG. 11 is a cross-sectional view that longitudinally bisects the motor housing and pivot base of FIG. 10.
Figure 13B:
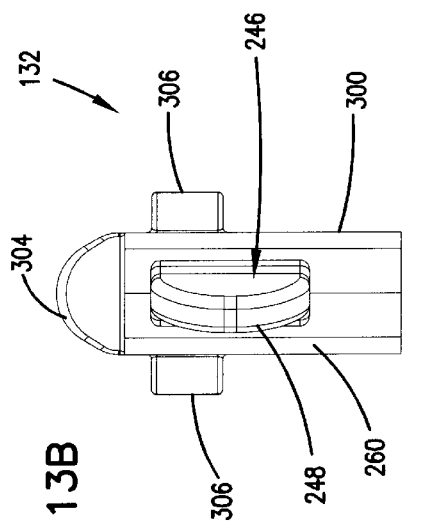
Figure 13D:
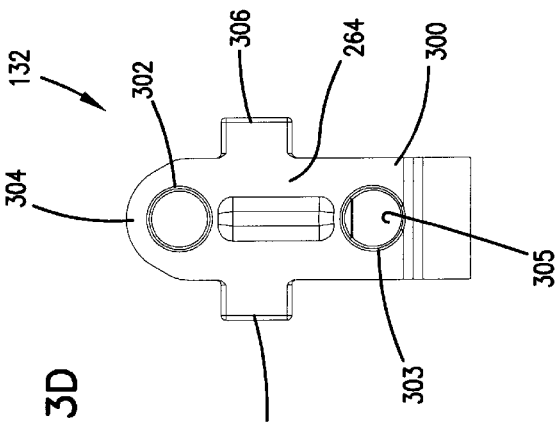
Figure 13A:
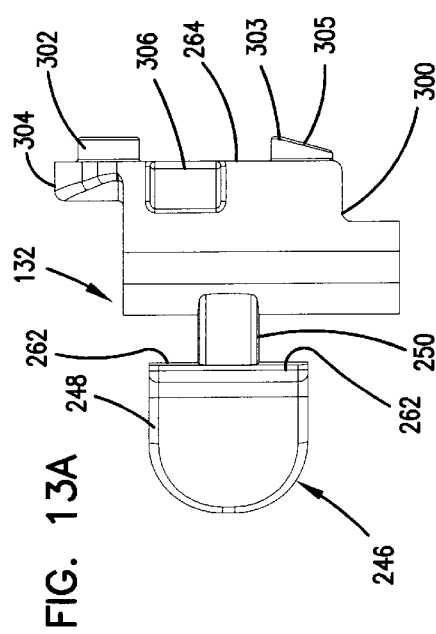
FIG. 13a is a front view of a movable clamp member used by the blade clamp shown in FIG. 2.
Figure 13C:
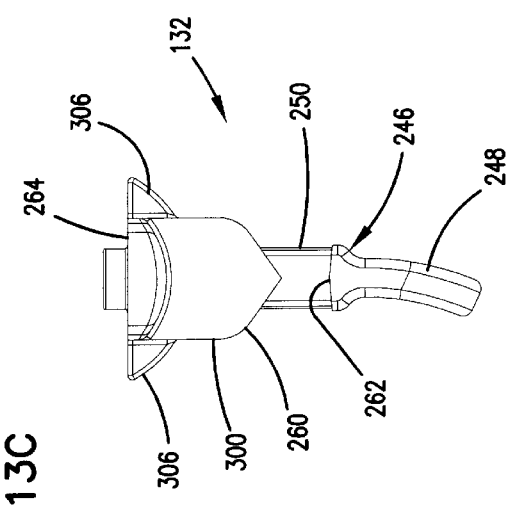

FIGS. 10–12 illustrate a base clamping mechanism arranged and configured for selectively clamping the housing 22 at desired pivot locations relative to the shoe 24. As previously described with respect to FIG. 2, the base clamping mechanism includes the threaded adjustment shaft 62, the fixed ramp or wedge 58, the moveable ramp or wedge 60, and the shoulder bolt 54. The shoulder bolt 54 connects the pivot base 63 to the motor housing 52. For example, as shown in FIG. 11, the shoulder bolt 54 extends upward through the curved slot 56 defined by the pivot base 36 and also through a circular opening 182 defined by the motor housing 52. The circular opening 182 is defined by a lower wall 184 of the motor housing 152, while the curved slot 56 is defined by a curved upper wall 186 of the pivot base 36. An upper end of the shoulder bolt 54 is threaded within a captured nut 188 mounted within the motor housing 52. The captured nut 188 is mounted to resist rotation, and the shoulder bolt 54 is preferably threaded within the captured nut 188 such that a shoulder 190 of the shoulder bolt 154 presses against the bottom surface of the captured nut 188.

The fixed wedge 58 and the moveable wedge 60 are mounted on the shoulder bolt 54. For example, referring again to FIG. 11, the shoulder bolt 190 extends through a circular aperture 192 defined by the fixed wedge 58 and an elongated opening 194 defined by the moveable ramp 60. The circular aperture 192 has a diameter that is generally equal to the outer diameter of the shoulder bolt 54. The elongated opening 194 is elongated in a forward direction that is generally parallel to the longitudinal axis L—L of the shoe 24.

Both the fixed wedge 58 and the moveable wedge 60 are captured or trapped between the curved upper wall 186 of the pivot base 36 and a head 196 of the shoulder bolt 54. The moveable wedge 60 is mounted above the fixed wedge 58. The fixed wedge 58 includes a bottom surface 198 that engages the head 196 and is generally transversely aligned with respect to the shaft of the shoulder bolt 54. Additionally, the fixed ramp 58 also includes a top surface 200 aligned at an acute angle with respect to the bottom surface 198. The top surface 200 inclines upward in a forward direction with respect to the shoe 24.

The moveable wedge 60 includes a top surface 202 that engages the curved upper wall 186 of the pivot base 36, and a bottom surface 204 that engages the top surface 200 of the fixed wedge 58. The top surface 202 is generally transversely aligned with respect to the shaft of the shoulder bolt 54, and the bottom surface 204 is aligned at an acute angle with respect to the top surface 202. The bottom surface 204 of the moveable wedge 60 is generally parallel with respect to the top surface 200 of the fixed wedge 58.

The fixed and moveable ramps 58 and 60 cooperate with the shoulder bolt 54 to selectively clamp the motor housing 52 relative to the pivot base 36. When the clamping mechanism is tightened or clamped, the motor housing 52 is inhibited from pivoting relative to the pivot base 36 about the longitudinal axis L—L. By contrast, when the clamping mechanism is released, loosened or unclamped, the motor housing 52 can be manually pivoted relative to the pivot base 36 about the longitudinal axis L—L with minimal resistance.

To tighten the clamping mechanism, the moveable wedge 58 is forced in a forward direction relative to the fixed wedge 58. As the moveable wedge 60 moves in the forward direction, the moveable wedge 60 is wedged between the top surface 200 of the fixed wedge 58 and the bottom surface of the curved upper wall 186 of the pivot base 36. Such a wedge action places an axial tension on the shoulder bolt 54 and causes the lower wall 184 of the motor housing 52 and the upper wall 186 of the pivot base 36 to be drawn together. For example, the wedge action pushes the head 196 of the shoulder bolt 54 downward relative to the upper wall 186 of the pivot base 36 causing the shoulder bolt 54 to pull downward on the captured nut 188. As the captured nut 188 is pulled downward, the lower wall 184 of the motor housing 52 and the upper wall 186 of the pivot base 36 are compressed together. As the lower and upper walls 184 and 186 are compressed together by the shoulder bolt 54, enhanced friction is generated between the concave surface 164 of the motor housing 52 and the convex surface 162 of the pivot base 36. Such enhanced friction resists movement of the motor housing 52 relative to the pivot base 36. Consequently, the motor housing 52 is effectively locked or clamped relative to the pivot base 36.

To release the clamping mechanism, the moveable wedge 60 is moved in a rearward direction relative to the fixed wedge 58. As the moveable wedge 58 moved rearward, the head 196 of the shoulder bolt 54 is allowed to move toward the curved upper wall 186 thereby reducing the pressure between the lower wall 184 of the motor housing 52 and the upper wall 186 of the pivot base 36. As the pressure is reduced, the friction between the convex and concave surfaces 162 and 164 is also reduced such that the motor housing 52 can be manually pivoted relative to the pivot base 36. When the motor housing 52 is pivoted relative to the pivot base 36, the shoulder bolt 54 slides along the curved slot 56 defined by the pivot base 36. Once the motor housing 52 has been moved to a desired pivot location, the clamp mechanism is re-tightened to retain the housing 52 in the desired position.

Referring to FIGS. 10 and 11, the pivot base 36 also defines a plurality of depressions 206. The depressions 206 are arranged and configured to receive ball detents 208 mounted within the motor housing 52. The ball detents 208 are biased downward by detent springs 210. Each of the depressions 206 corresponds to a particular cutting angle that may be desired. For example, the depressions 206 can be located at positions corresponding to a perpendicular cutting angle as well as cutting angles of 15 degrees, 30 degrees, and 45 degrees offset from perpendicular. The ball detents 208 and depressions 206 help a user quickly and precisely set the jigsaw 20 at a desired cutting angle.

It will be appreciated that a variety of arrangements can be used to move the moveable wedge 60 relative to the fixed wedge 58. As shown in FIGS. 11 and 12, the threaded adjustment shaft 62 is used to control the position of the moveable wedge 60. The adjustment shaft 62 is aligned generally parallel with respect to the longitudinal axis L—L and is rotatably mounted in a downwardly opening slot 212 formed in the motor housing 52. The adjustment shaft 62 is retained in the slot 212 by a cross pin 214. A flange 216 limits axial movement of the adjustment shaft 62 relative to the motor housing 52 and the pivot base 36. For example, as shown in FIG. 11, the flange is captured between the motor housing 52 and the pivot base 36.

The adjustment shaft 62 has a threaded end 218 having external threads. The threaded end 218 is threaded within a longitudinal slot 220 defined by the moveable wedge 60. The longitudinal slot 220 includes internal threads that mate with the external threads of the threaded end 218. When the adjustment shaft 62 is rotated in a first direction, the internal and external threads cooperate to force the moveable wedge 60 in the forward direction toward the fixed wedge 58. By contrast, when the adjustment shaft 62 is rotated in a second direction opposite to the first direction, the internal and external threads cooperate to pull the moveable wedge 60 rearward away from the fixed wedge 58.

The adjustment shaft 60 is also equipped with a lever arm 222 for increasing the manual torque that can be applied to the adjustment shaft 62. The lever arm 222 is telescopically mounted within a handle portion 224 of the adjustment shaft 62. By telescopically extending the lever arm 222 outward from the handle portion 224, and pivoting the lever arm 222 90 degrees about pivot pin 226, the lever arm 222 can be used to increase the manual torque applied to the adjustment shaft 62.

Referring back to FIG. 2, the basic components of the blade clamp 28 used by the jig saw 20 include the fixed clamp member 130, the moveable clamp member 132, the collar 134, and the coil spring 136. When assembled, the blade clamp 28 is adapted to releasably clamp or secure a blade to the bottom end of the blade holder shaft 116.

Referring now to FIGS. 13a–13d, various views of the moveable clamp member 132 are shown. The moveable clamp member 132 includes a main body 300. A clamping face 264 and an inner follower surface 260 are formed on opposite sides of the main body 300. First and second axially aligned projections 302 and 303 project transversely outward from the clamping face 264. The first projection 302 is generally cylindrical, while the second projection 303 has a ramped surface 305. The moveable clamp member 132 also includes a rounded end 304 and transverse wings 306 that project transversely outward from the main body 300.

The first and second projections 302 and 303 are arranged and configured to secure a universal blade to the moveable clamp member 132. For example, FIGS. 14a and 14b show the moveable clamp member 132 connected to a universal blade 324. As shown in FIGS. 14a and 14b, the second projection 303 of the moveable clamp member 132 fits within an opening 326 of the universal blade 324, while first projection 302 of the moveable clamp member 132 fits within a top notch 328 formed on the universal blade 324. The projections 302 and 303 of the moveable clamp member 132 inhibit axial movement of the universal blade 324 relative to the moveable clamp member 132.

Referring back to FIGS. 13a–13d, the moveable clamp member 132 also includes a jaw lever 246 that projects outward from the inner follower surface 260. The jaw lever 246 includes an extension 250 connected to the main body 300 of the moveable clamp member 132. The jaw lever 246 also includes a distally located jaw tab 248 having outer follower surfaces 262 positioned on opposite sides of the extension 250. The outer follower surfaces 262 on the jaw tab 248 generally oppose the inner follower surface 260 formed on the main body 300.

FIGS. 15a–15c illustrate the fixed clamp member 130 of the blade holder 28. The fixed clamp member 130 is fixedly connected to the bottom end of the blade holder shaft 116. The shaft 116 includes a slot 117 for facilitating clamping the shaft 116 between the drive bracket 124 and the drive clamp 126 (shown in FIG. 2).

Referring to FIGS. 15a–15c, the fixed clamp member 130 includes a main axial slot 252 aligned along a longitudinal axis A—A of the shaft 116. The main axial slot 252 is sized for receiving the moveable clamp member 132. A curved end 253 of the main axial slot 252 is sized to receive the rounded end 304 of the moveable clamp member 130. A secondary axial slot 255 defined by the fixed clamp member 130 is sized to receive the first and second projections 302 and 303 of the moveable clamp member 130 when the moveable clamp member 132 is mounted within the main axial slot 252.

The fixed clamp member 130 also includes first and second transverse slots 308 and 310. The first transverse slot 308 is sized and shaped to receive tangs of a tang blade. The second transverse slot 310 is arranged and configured to receive the transverse wings 306 of the moveable clamp member 132 when the moveable clamp member 132 is mounted within the main axial slot 252. The first and second transverse slots 308 and 310 are defined by first, second and third shoulders sets 312, 313 and 314. Each of the shoulder sets 312, 313 and 314 includes a separate shoulder positioned on opposite sides of a gap 316 that corresponds to the width of the main axial slot 252. The gap 316 is sized for receiving either a tang blade or a universal blade.

FIGS. 16a and 16b show the fixed clamp member 130 with a tang blade trapped therein. As shown in FIGS. 16a and 16b, oppositely disposed tangs 320 of the tang blade 319 fit within the first transverse slot 308 of the fixed clamp member 130. The first and second shoulder sets 312 and 313 inhibit axial movement of the blade 319 relative to the fixed clamp member 130.

FIG. 17 illustrates the fixed clamp member 130 with the moveable clamp member 132 mounted in the main axial slot 252. As shown in FIG. 17, the transverse wings 302 of the moveable clamp member 132 fit within the second transverse slot 310 of the fixed clamp member 130. The transverse wings 306 function to transfer axial loading from a universal blade mounted on the moveable clamp member 132 directly to the blade holder shaft 116 through the fixed clamp member 130.

FIGS. 18 and 19 provide assembled views of the blade clamp 28. As shown in FIGS. 18 and 19, the moveable clamp member 132 is mounted in the main axial slot 252 of the fixed clamp member 130 (as shown in FIG. 17). The collar 134 is mounted over both the fixed clamp member 130 and the moveable clamp member 132. The collar 134 is pivotally moveable relative to the fixed and moveable clamp members 130 and 132 about the longitudinal axis A—A of the shaft 116. The spring 136 is mounted over the shaft 116 and has a first end 230 fixedly secured relative to the collar 134 (as shown in FIG. 19), and a second end 232 fixedly secured relative to the shaft 116 (as shown in FIG. 18).

Referring now to FIGS. 20a and 20b, the collar 134 defines a circumferential slot 234 having a first end 240 positioned opposite from a second end 244. The collar 134 also defines an axial access slot 236 located adjacent to the second end 244 of the circumferential slot 234. The collar 134 further includes a radial collar tab 242 positioned adjacent to the first end 240 of the circumferential slot 234. The extension 250 of the jaw lever 246 extends outward through the circumferential slot 234, and jaw tab 248 is positioned outside the collar 134.

The collar 134 is pivotally moveable off the longitudinal axis A—A between a blade clamping position (shown in FIG. 20a) where the blade clamp 28 is adapted to clamp a blade, and a blade release position (shown in FIG. 20b) where a blade can be inserted into or removed from the blade clamp 28. In the blade clamping position, the jaw lever 246 is located adjacent to the second end 244 of the circumferential slot 234. In the blade release position, the jaw lever 246 is located adjacent to the first end 240 of the circumferential slot 234. The spring 136 biases the collar 134 toward the blade clamping position.

A user preferably moves the collar 134 from the position of clamping position of FIG. 20a to the blade release position of FIG. 20b by manually pushing the collar and jaw tabs 242 and 248 toward one another. As the collar and jaw tabs 242 and 248 are pushed toward one another, the collar 134 pivots about the longitudinal axis A—A against resistance provided by the spring 136. Also, as the collar 134 is pivoted, relative movement is generated between the circumferential slot 234 and the jaw lever 246 such that the first end 240 of the circumferential slot 234 moves toward the jaw lever 246. With the blade clamp 28 manually held in the position of FIG. 20b, a blade can be inserted in the blade clamp 28. Once the blade is inserted in the blade clamp 28, the collar and jaw tabs 242 and 248 can be released thereby allowing the spring 136 to return the blade clamp 28 to the position of FIG. 20a.

Figure 21A:
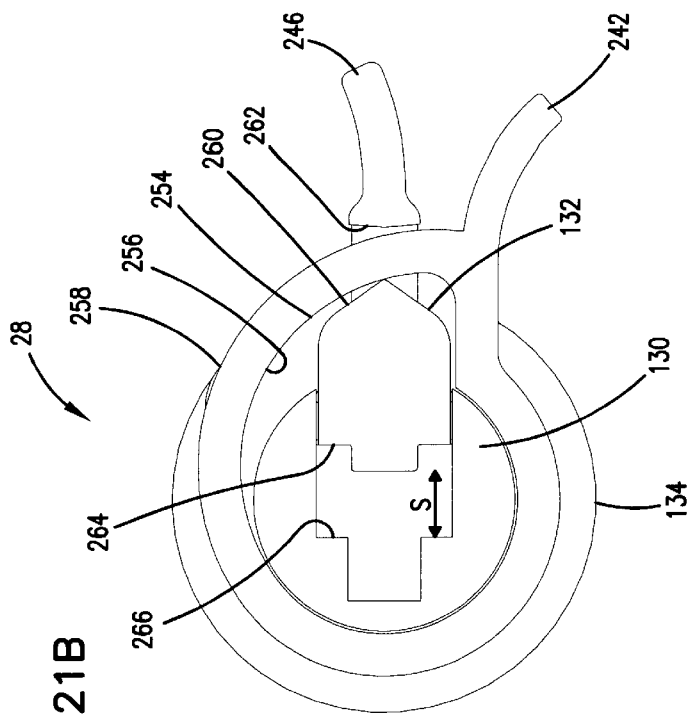
Figure 21B:
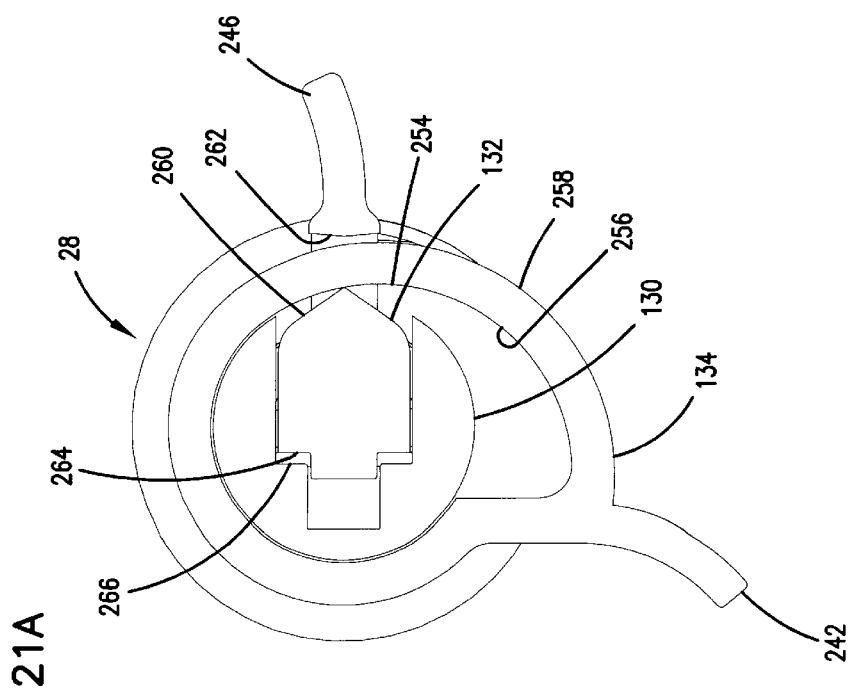
FIG. 21b is a schematic bottom view of FIG. 20b.

FIG. 21 a is a bottom view of the blade clamp 28 showing the blade clamp 28 in the blade clamping position of FIG. 20a. In the blade clamping position, the clamping face 264 of the moveable clamp member 232 is in close proximity to the corresponding clamping face 266 formed on the fixed clamp member 130. FIG. 21a is a bottom view of the blade clamp 28 showing the blade clamp 28 in the blade release position of FIG. 20b. As shown in FIG. 21b, the moveable clamp member 132 is pulled away from the fixed clamp member 130 such that a relative large spacing S exists between the clamping faces 264 and 266. The spacing is preferably sufficiently large to allow a jigsaw blade to be inserted between the clamping faces 264 and 266, or removed from between the clamping faces 264 and 266.

A cam mechanism is used to move the moveable clamp member 232 between the clamping position of FIG. 21a and the blade release position of FIG. 21b. For example, as shown in FIGS. 21a and 21b, the collar 134 includes a cam wall or portion 254 that curves gradually away from the axis A—A of rotation of the collar 134. The circumferential slot 234 (shown in FIGS. 20a and 20b) is formed through the cam portion 254. Referring to FIGS. 21a and 21b, the cam portion 254 includes inner cam surfaces 256 and outer cam surfaces 258. The inner cam surfaces 256 face or engage the inner follower surface 260 formed on the moveable clamp member 232. Similarly, the outer cam surfaces 258 face or engage outer follower surfaces 262 formed by the jaw tab 248.

With respect to FIG. 21a, by pivoting the collar 134 in a counterclockwise direction about the axis of rotation A—A, the collar tab 242 is moved toward the jaw tab 248. As the collar 134 is pivoted, the cam portion 154 of the collar 134 slides along the moveable clamp member 132. As the cam portion 254 slides relative to the moveable clamp member 132, the outer cam surfaces 258 engage the outer follower surfaces 262 causing the moveable clamp member 132 to be pulled away from the fixed clamp member 130. In this manner, the moveable clamp member 132 is moved from the blade clamping position of FIG. 21a to the blade release position of FIG. 21b.

After a blade has been inserted into or removed from between the clamping faces 264 and 266, the collar tab 242 can be released causing the spring to pivot the collar 134 clockwise about the pivot axis A—A. As the collar 134 pivots clockwise about the pivot axis A—A, the inner follower surface 260 engages the inner cam surfaces 256 causing the moveable clamp member 132 to be pushed toward the fixed clamp member 130. In this manner, the moveable clamp member 132 is moved from the blade release position of FIG. 21b back to the clamping position of FIG. 21a.

The blade clamp 28 is preferably assembled by first placing the moveable clamp member 132 within the main axial slot 253 of the fixed clamping member 130. Next, the collar is inserted over the shaft 116 and slid downward over both the moveable and fixed clamp members 132 and 130. As the collar 134 is slide downward, the collar is oriented such that the jaw lever 246 is received in the axial access slot 236. The jaw lever 246 travels through the access slot 236 and enters the circumferential slot 234. Once the jaw lever is positioned in the circumferential slot 234, the spring 136 is slid over the shaft 116 and positioned on top of the collar 134. Finally, the first end 230 of the spring 136 is fixedly secured to the collar 134, and the second end 232 of the spring 136 is fixedly secured to the shaft 116.

With regard to the foregoing description, it is to be understood that changes may be made in detail, especially in matters of the shape, size and arrangement of the parts without departing from the scope of the present invention. It is intended that the specification and depicted embodiment be considered exemplary only, with a true scope and spirit of the invention being indicated by the broad meaning of the following claims.

We claim:

1. A jigsaw blade clamp comprising:
    a first clamp member defining a main slot;
    a second clamp member positioned within the main slot, the second clamp member being moveable relative to the first clamp member between a first position in which the first and second clamp members are adapted to clamp a blade, and a second position in which the blade can be inserted between the first and second clamp members; and
    a collar being pivotally moveable in first and second opposite directions relative to the first and second clamp members, the collar including a cam portion that moves the second clamp member toward the first position when the collar is pivoted in the first direction, and also moves the second clamp member toward the second position when the collar is pivoted in the second direction.

2. The blade clamp of claim 1, wherein the first clamp member is fixedly connected to a reciprocating shaft.

3. The blade clamp of claim 1, wherein at least one of the first and second clamp members includes a projection arranged and configured to fit within a mounting opening of a universal blade.

4. The blade clamp of claim 1, wherein at least one of the first and second clamp members includes a first projection arranged and configured to fit within a mounting opening of a universal blade, and a second projection arranged and configured to fit within a top notch of the universal blade.

5. The blade clamp of claim 4, wherein the first projection is ramped.

6. The blade clamp of claim 1, wherein at least one of the first and second clamp members includes a transverse slot arranged and configured for trapping the oppositely disposed tangs of a tang blade.

7. The blade clamp of claim 3, wherein at least one of the first and second clamp members includes a transverse slot arranged and configured for trapping the oppositely disposed tangs of a tang blade.

8. The blade clamp of claim 7, wherein the projection is formed on the second clamp member, and the transverse slot is defined by the first clamp member.

9. The blade clamp of claim 1, wherein the first clamp member includes first and second shoulders positioned on opposite sides of the main slot, the shoulders being arranged and configured for engaging oppositely disposed tangs of a tang blade.

10. The blade clamp of claim 9, wherein the projection is formed on the second clamp member and extends toward the first clamp member into the main slot.

11. The blade clamp of claim 1, wherein at least one of the first and second clamp members defines a transverse slot, and the other of the first and second clamp members includes transverse projections that fit within the transverse slot to allow axial loading to be transferred between the first and second clamp members.

12. The blade clamp of claim 11, wherein the transverse slot is formed by the first clamp member, and the transverse projections are formed on the second clamp member.

13. The blade clamp of claim 1, further comprising a spring that biases the collar in the first direction.

14. The blade clamp of claim 1, wherein the cam portion of the collar curves gradually away from a pivot axis of the collar.

15. The blade clamp of claim 14, wherein the cam portion defines a circumferential slot, and the second clamp member includes an extension member that extends through the circumferential slot.

16. The blade clamp of claim 15, wherein the second clamp member includes a tab positioned at a distal end of the extension member at a location outside the collar.

17. A jigsaw blade clamp comprising:
    first and second clamp members moveable between a blade release position in which a blade can be inserted between and removed from between the first and second clamp members, and a clamping position in which the first and second clamp members are adapted to clamp the blade thereinbetween;
    the first clamp member including first and second spaced-apart shoulders separated by a gap, the first and second shoulders extending from the first clamp member toward the second clamp member, the first and second shoulders being arranged and configured to trap a tang blade within the blade clamp by engaging oppositely disposed tangs of a tang blade when the tang blade is positioned within the gap;
    the second clamp member including a projection extending from the second clamp member toward the first clamp member, the projection being arranged and configured to fit within a mounting opening of a universal blade when the universal blade is positioned in the gap between the shoulders; and
    wherein the first blade clamp includes a transverse slot, and the second blade clamp includes transverse wines that fit within the transverse slot.

18. The blade clamp of claim 17, wherein the projection is positioned in general axial alignment with the gap between the first and second shoulders.

19. A jigsaw blade clamp comprising:
    a first clamp member;

a second clamp member having a portion that opposes the first clamp member, the second clamp member being moveable relative to the first clamp member between a first position in which the first and second clamp members are adapted to clamp a blade, and a second position in which the blade can be inserted between the first and second clamp members;

a collar that is pivotally moveable in first and second opposite directions relative to the first and second clamp members, the collar including a cam portion for positively moving the second clamp member between the first and second positions, the second clamp member being forced by the cam portion toward the first position when the collar is pivoted in the first direction, and the second clamp member being forced by the cam portion toward the second position when the collar is pivoted in the second direction; and a spring that urges the collar to pivot in the first direction.

20. The blade clamp of claim 19, wherein the cam portion of the collar curves gradually away from a pivot axis of the collar.

21. The blade clamp of claim 20, wherein the cam portion defines a circumferential slot, and the second clamp member includes an extension member that extends through the circumferential slot.

22. The blade clamp of claim 21, wherein the second clamp member includes a finger grip positioned at a distal end of the extension member at a location outside the collar.

23. The blade clamp of claim 22, wherein an outer surface of the cam-portion engages the finger grip to positively move the second clamp member toward the second position when the collar is pivoted in the second direction.

\* \* \* \* \*